(12) United States Patent  (10) Patent No.: US 7,542,210 B2
Chirieleison, Sr.  (45) Date of Patent: Jun. 2, 2009

(54) EYE TRACKING HEAD MOUNTED DISPLAY

(76) Inventor: Anthony Chirieleison, Sr., P.O. Box 279, Tyrone, NM (US) 88065

( * ) Notice: Subject to any disclaimer, the term of this patent is extended or adjusted under 35 U.S.C. 154(b) by 0 days.

(21) Appl. No.: 11/476,553

(22) Filed: Jun. 29, 2006

(65) Prior Publication Data

US 2008/0002262 A1  Jan. 3, 2008

(51) Int. Cl.
*G02B 27/14* (2006.01)
*G09G 5/00* (2006.01)
(52) U.S. Cl. .......................... 359/630; 345/8
(58) Field of Classification Search ......... 359/630–636; 345/7–9
See application file for complete search history.

(56) References Cited

U.S. PATENT DOCUMENTS

| | | | |
|---|---|---|---|
| 4,028,725 A | 6/1977 | Lewis | 358/103 |
| 5,467,104 A | 11/1995 | Furness, III et al. | 345/8 |
| 5,572,229 A | 11/1996 | Fisher | 345/8 |
| 5,742,264 A * | 4/1998 | Inagaki et al. | 345/8 |
| 6,307,526 B1 * | 10/2001 | Mann | 345/8 |
| 6,452,572 B1 | 9/2002 | Fan et al. | 345/8 |
| 6,744,436 B1 | 6/2004 | Chirieleison, Jr. et al. | 345/427 |
| 7,111,939 B2 * | 9/2006 | Cok et al. | 353/7 |
| 2002/0167462 A1 | 11/2002 | Lewis et al. | 345/7 |
| 2004/0008157 A1 | 1/2004 | Brubaker et al. | 345/8 |
| 2006/0077558 A1 * | 4/2006 | Urakawa et al. | 359/630 |

OTHER PUBLICATIONS

Chirieleison, Sr., Anthony. *Requirements for an Eye Mounted Display (EMD) System.* Mar. 20, 2005.

* cited by examiner

*Primary Examiner*—Alicia M Harrington
(74) *Attorney, Agent, or Firm*—Nath Law Group; Jerald L. Meyer; Jiaxiao Zhang

(57) ABSTRACT

A head mounted display device has a mount which attaches the device to a user's head, a beam-splitter attached to the mount with movement devices, an image projector which projects images onto the beam-splitter, an eye-tracker which tracks a user's eye's gaze, and one or more processors. The device uses the eye tracker and movement devices, along with an optional head-tracker, to move the beam-splitter about the center of the eye's rotation, keeping the beam-splitter in the eye's direct line-of-sight. The user simultaneously views the image and the environment behind the image. A second beam-splitter, eye-tracker, and projector can be used on the user's other eye to create a stereoptic, virtual environment. The display can correspond to the resolving power of the human eye. The invention presets a high-resolution image wherever the user looks.

29 Claims, 17 Drawing Sheets

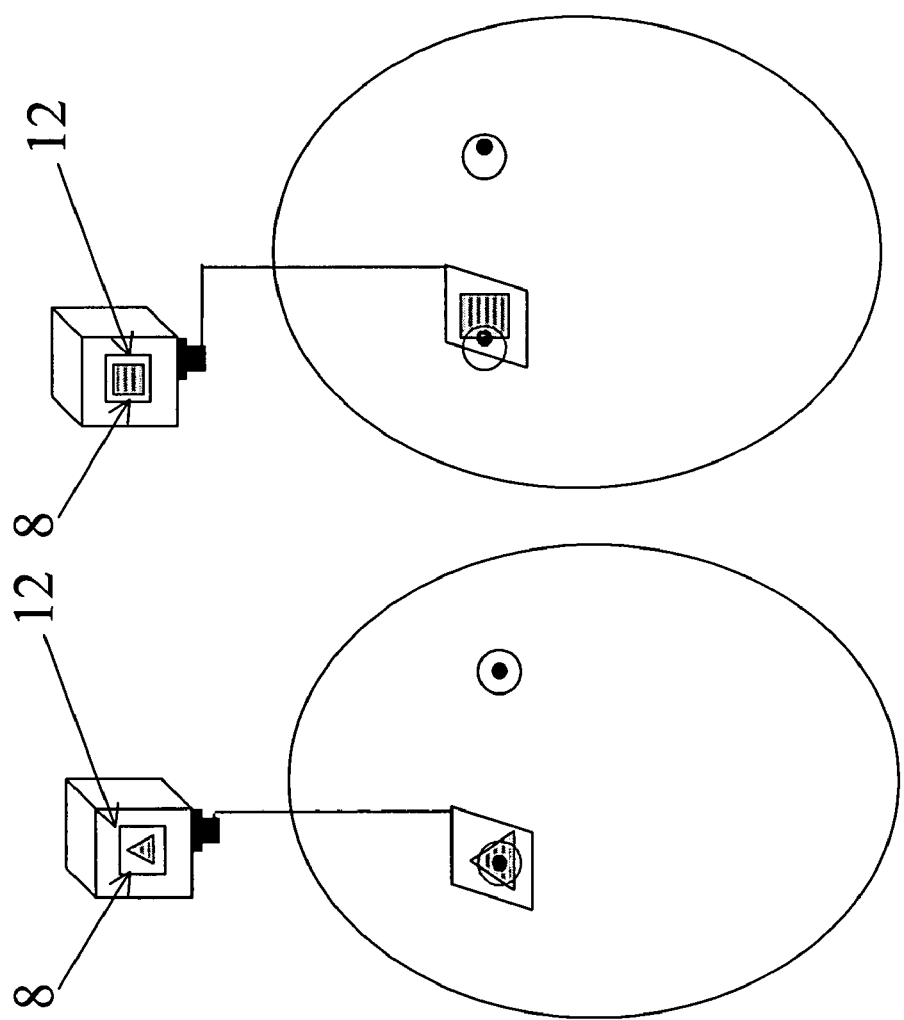
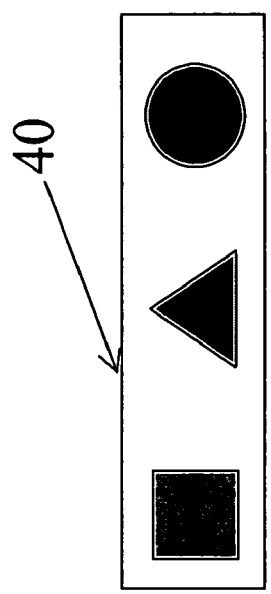
FIG. 4A  FIG. 4B  FIG. 4C

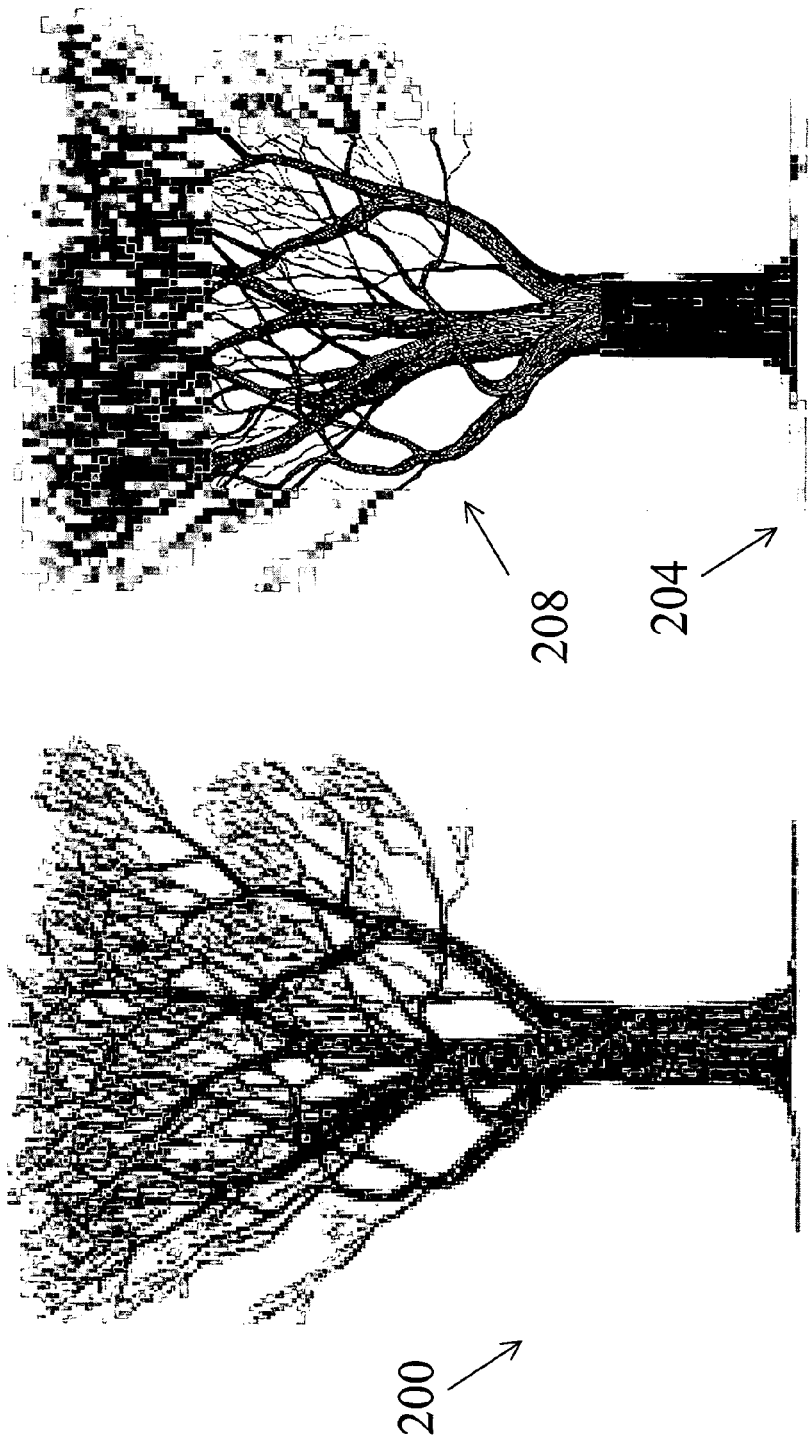

EYE TRACKING HEAD MOUNTED DISPLAY

FIELD OF THE INVENTION

The present invention relates to head mounted display systems and more particularly, to head mounted display systems which use eye-tracking technology.

BACKGROUND OF THE INVENTION

Head mounted display systems (HMDs) are devices, worn on a user's head, which display information to a user. Some HMDs project their display onto large, fixed surfaces in front of a user's eyes. The display surface can be a partially-reflective, partially-transmissive surface, known in the art as a beam-splitter, attached to the user's face and enabling the user to simultaneously view the display and the environment. Alternately, the display surface can be a retro-reflective screen as in U.S. Pat. No. 5,572,229 to Fisher, entitled "Head Mounted Projection Display System Featuring Beam-splitter and Method of Making Same." Other HMDs use optics (like mirrors and beam-splitters) to project a display directly onto a user's eye.

HMDs are currently used for a wide range of applications, both military and civilian. Historically, head mounted displays have been used by pilots and soldiers to supplement the information they draw from their environment with real-time computer-processed information to better enhance their view and inform their decisions. Other users of head mounted display systems include: video gamer players seeking a virtual-reality playing experience; warehouse managers seeking an enhanced stock location and coordination system (see U.S. Pat. No. 6, 744,436 to Chirieleison, Jr. et al, which is incorporated herein by reference); television and movie viewers seeking privacy and/or an enhanced viewing experience; vehicle operators seeking greater feedback about vehicle and environmental conditions; and, computer users seeking a compact working environment. HMDs are used in many more environments than so-called "heads-up displays" or HUDs, as HMDs may be worn by a user in many environments, including those in which the use of a HUD might be difficult or impossible.

For all their uses, however, HMDs have historically had a number of problems for which solutions have seemed either impossibly costly, or impossibly difficult to execute. For example:

To produce even a small display area, HMDs have typically required equipment that is bulky, heavy, unwieldy, uncomfortable, and expensive.

Typical HMDs fail to cover all of the directions in which the eye can look, leading to a discontinuous image, an unenhanceable "blind spot," or a lack of image altogether at the periphery. For such a head mounted display, see U.S. Pat. No. 6,452,572 to Fan et al.

Typical HMDs have elements that obscure a fixed portion of a user's field-of-view. Optics such as lenses, and mechanical elements such as servos, motors, and support structures occupy valuable property in the user's visual field. For an example of an early attempt at a high-resolution vision system which follows the line-of-sight with such elements, see U.S. Pat. No. 4,028,725 to Lewis.

Producing a large field-of-view with an HMD typically requires a reduction in display resolution, leading to less information, and less precision. Alternately, the use of a high display resolution requires a narrow and constricting field of view.

While the distribution of rods, cones, and other structures within the eye is not even or symmetrical, HMDs typically produce the same pixel density and image type for every part of the eye, leading to a discontinuous, uncomfortable, and suboptimal viewing experience, which wastes information density where the eye is ill equipped to handle it.

HMDs often produce images from a single source in space, leading to variations in the image perceived when the eye is at different angles from the source. Systems to compensate for this angular distortion can involve digital alteration of the image, which can squander processing power and require specialized hardware.

Delivering an image from a location on the HMD to the eye often requires a large number of optical components like mirrors, beam-splitters, and lenses. Each of these components not only increases the weight of the device, but can distort or dim the image; collectively, they require a source image of the highest precision and brightness to provide an image of acceptable quality to the eye. For an example of a HMD which uses multiple mirrors in this manner, see U.S. Patent Application Publication No. 2002/0167462 to Lewis et al.

HMDs which project directly onto the retina pose unique safety risks and alignment problems. For an example of a HMD of this type, see U.S. Pat. No. 5,467,104 to Furness, III et al.

The demand for a display that covers a large field of view but with sufficient resolution has led some to superimpose two or more images in a single HMD, adding a high resolution inset image to an image with a low resolution but a wide field of view. Such system designers often encounter an exponential increase in system complexity, as they must use twice the equipment and processing power to produce two images per eye, and then keep these images spatially and temporally synchronized at all times. Further, when the user turns his gaze outside of the inset area, the fovea of his eye is presented with low-density information, while his periphery receives high-density information, which is the opposite of ideal.

The field of Head Mounted Displays would benefit greatly from a display which could continuously present very detailed imagery in the center of a user's eye, wherever the user looks, without requiring heavy equipment or demanding image processing for basic image projection. A novel invention providing these features will now be described.

SUMMARY OF THE INVENTION

The present inventive subject matter is directed to a head mounted display device having a mount which secures the device near a user's head, and a beam-splitter attached to the mount with movement devices, wherein the movement devices displace the beam-splitter about a center of rotation of an eye of the user. The beam-splitter reflects at least one output image toward the user's eye, and transmits light incident on the beam-splitter to the user's eye. An image projector projects the output image onto said beam-splitter, an eye-tracker measures the viewing direction of an eye of the user and produces corresponding coordinate information, and at least one processor, in communication with the eye-tracker and the movement devices, commands the movement devices to reposition the beam-splitter based on the coordinate information.

The present inventive subject matter is also directed to a method of displaying an image, the method comprising: producing an image at an image projector, projecting the image onto a beam-splitter, the beam-splitter reflecting the image toward a user's eye, the beam-splitter transmitting light incident upon it to a user's eye, tracking changes in the direction of a user's eye's gaze, producing coordinate information based on changes in the direction of a user's eye's gaze, applying the coordinate information to determine a position for said beam-splitter which would place it within a user's eye's gaze, and moving the beam-splitter so as to place it at the center of the user's eye's gaze.

The present inventive subject matter is also directed to a system for displaying an image, the system comprising: means for producing an image at an image projector, means for projecting the image onto a beam-splitter, the beam-splitter having means for reflecting the image toward a user's eye, the beam-splitter having means for transmitting light incident upon it to a user's eye; means for tracking changes in the direction of a user's eye's gaze, means for producing coordinate information based on changes in the direction of a user's eye's gaze, means for applying the coordinate information to determine a position for the beam-splitter which would place it within a user's eye's gaze, and means for moving the beam-splitter so as to place it in the user's eye's gaze.

One embodiment of the present inventive subject matter is a moveable, or "flying" head mounted display that uses eye-tracking technology. (Alternately, the device may be though of as an "eye-mounted display," as the display direction is slaved to the direction of the eye's gaze.) The device includes a mount for attachment to a user's head, a beam-splitter attached to the mount with movement devices, an image projector, an eye-tracker, and at least one processor. The beam-splitter reflects images projected by the projector toward the user's eye. The eye-tracker always keeps the beam-splitter in the same position, and facing the same direction, relative to the eye's center of rotation and center of gaze. As the eye turns beyond a tolerance threshold, the eye tracker informs the processor, which commands movement devices to reposition the beam-splitter so that the direct line-of-sight of the eye is again through the beam-splitter.

In another embodiment, there is provided a head mounted display, with motors attached to a mount, and with beam-splitters attached to motors by rigid elements. The rigid elements remain essentially outside of the user's view, while allowing a beam-splitter to move in a spherical plane centered on one of the user's eyes. A beam-splitter is positioned in the user's line-of-sight, and an image projector with display producer projects images onto the beam-splitter. In this way, the user may simultaneously view projected images and objects behind the beam-splitters. Optionally, a second combination of motors, mounts, projector and beam-splitter may be disposed at the user's head, and the motion of the second beam-splitter centered on the other of the user's eyes. With two such combinations, the user simultaneously views three-dimensional projected images and real-world objects. An eye-tracker monitors the user's gaze with a camera attached to the rigid element and placed between the beam-splitter and the display. The camera has direct vision of the eye. The processor receives measurements from the eye-tracker. When the user moves his eyes, the processor uses these measurements in instructing the motors to move the beam-splitter back into the user's line-of-sight and the camera again looking directly into the user's eye. Two such eye-trackers may be used when two beam-splitters are used (again, one before each eye.) The rigid elements absorb undesirable resonance and vibrations that may occur while moving the beam-splitter. The motion of the beam-splitter is fast, and optionally not salient to the user. Additional optics and digital image control can be used to adjust the intensity, focus, and pixel distribution of the image to better match characteristics of the user's eye and the user's eye resolving power. Beam-splitters of varying transmission indices can be used to match the intensity of the image to the intensity of ambient light. Additional adjustments can be made to the image to compensate for any angular displacement from the user's eye.

In yet another embodiment, there is provided a head mounted display with beam-splitters attached to motors by a rigid element, wherein the motors move along the mount on tracks. The tracks can guide the beam-splitters in any combination of roll, pitch, and yaw about the center of each eye. The rigid element remains essentially outside of the user's view, while allowing the beam-splitters to move in a sphere where the center of all device rotations is about the center or rotation of the observer's eye. Additional motors attached between the beam-splitter and the mount can adjust the angle of the beam-splitter to maintain direct projection toward the user's eye. Again, a second combination of motors, mounts, projector and beam-splitter may be disposed at the user's head, and the motion of its beam-splitter centered on the other of the user's eyes.

In yet another embodiment, there is provided a head mounted display which uses both an eye-tracker and a head-tracker. The eye-tracker is in communication with a processor that commands the motors. The eye-tracker and head-tracker are both in communication with an image processor, which may be a second processor, or the same processor that commands the motors. The image processor uses the information from the eye-tracker and the head-tracker to select images for projection by the display. Again, a second combination of motors, mounts, projector and beam-splitter is disposed at the user's head, and the motion of its beam-splitter is centered on the other of the user's eyes. In this way, the display can present three-dimensional images which correspond to the real-world objects in the user's line-of-sight. The display can also present images which change as the user's view changes, creating a virtual environment for the user in which virtual objects can seem to exist in a fixed point in space. In this way, the user can look at or away from these objects by moving his eyes and/or head toward or away from them, respectively. The display can present images as if they are attached to the beam-splitter (and thus in a constant region of the user's eye's field of view), as if they are attached to a vehicle or other space occupied by the user, or as if they are attached to objects in the outside world (which may be moving independently of such a vehicle).

In all of these embodiments, a single beam-splitter can be used to present information to only one eye, or two beam-splitters may be controlled separately to provide a stereoptic display. When two displays are used, one for each eye, an illusion of depth is maintained just as in a natural environment, where each eye gathers independent images which form a stereo image in the brain. Although the method below generally describes the device as applied to one eye, it is to be understood that two devices can be simultaneously disposed, each with an independent range of motion, one for each eye, which can together produce such a stereoptic display.

In yet another embodiment, measurements from the eye-tracker allow the user to control objects in the virtual environment with his gaze.

These and other aspects, objects, features and advantages of the present invention will be more clearly understood and appreciated from a review of the following detailed description of the embodiments and appended claims, and by reference to the accompanying drawings.

BRIEF DESCRIPTION OF THE FIGURES

In the detailed description of the invention presented below, reference is made to the accompanying drawings in which:

FIG. 4A shows a display projecting a portion of a virtual display to a user.

FIG. 4B shows the display of FIG. 4A, projecting a different portion of a virtual display to a user.

FIG. 4C shows a virtual display with three elements, as displayed to a user in FIG. 4A and FIG. 4B.

FIG. 5C shows an image as produced by a conventional display.

FIG. 5D shows an image as produced by a display according to the present invention.

DETAILED DESCRIPTION OF THE INVENTION

Figure 1A:
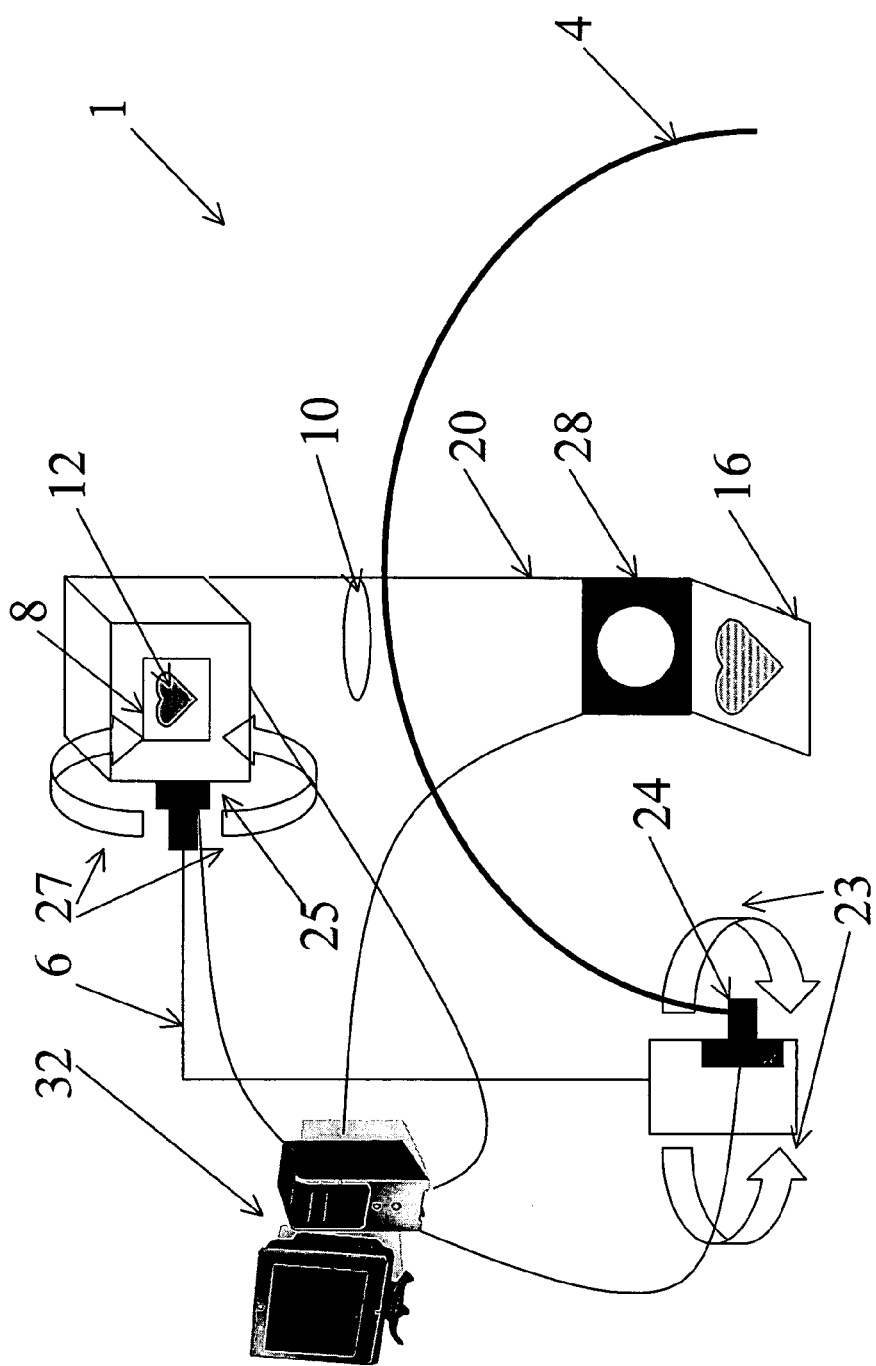
FIG. 1A is a front view of display according to the present invention.

As shown in FIG. 1A, a mount 4 is provided to connect the HMD 1 to a user. The mount 4 stabilizes the device relative to a user's head. Optionally, it can also allow the device to turn when the user turns his head. A mount can take the form of a hardhat, a helmet, a ball cap or other style of hat, a visor, glasses, goggles, a wire dome, nylon straps, or any other structure that can be secured to a user's head. A good mount provides a sturdy connection to the head while remaining lightweight, comfortable, superposable (capable of being placed over or under additional headwear or head mounts), and easy to put on and take off.

In FIG. 1A, a projector 8 is attached to the mount 4 by way of a first rigid element 6. The projector produces images 12 which are to be presented to the user. Various types of projectors may be used, including film projectors, digital light projectors, active or passive liquid crystal displays, and any display which can project an image onto a beam-splitter. Some projectors emit light on their own, some use reflected light, and some may even use a backlight to project their images forward. In one embodiment, a backlit liquid crystal display is attached directly to the mount, out of view of the user. In another embodiment, the projector receives image information from a computer; the computer is operated at a distance from the projector, but the projector is in electronic communication with the graphics card.

The projector can also be in electronic communication with a variety of cameras and sensors, optionally by way of a processor, that cover the entire electromagnetic spectrum. A camera could be mounted outside of a vehicle, and the observer could be inside of the vehicle, or even remotely located, and commanding the cameras/sensors to look where the observer is looking. Elements like a zoom lens can be incorporated with these cameras/sensors so that the zoomed portion of an image is projected in the fovea where an observer concentrates his gaze. Such a system could give the user "bionic eyes," to not only see through the vehicle or across a distance, but to gain total situational awareness. In the case of a fighting vehicle, or a ship, or an underground bunker, as non-limiting examples, the observer could be safely behind inches of steel but while sitting inside could effectively see through the enclosure. This capability would keep the observer safe, but provide total situational vision just as if the observer were to open the hatch of the vehicle or enclosure and expose himself to enemy fire while he gets a better look. In another non-limiting vehicular example, people who are paralyzed and confined to a wheel chair could obtain full situational awareness with this invention and the addition of rear and side mounted cameras to the wheel chair.

Not all of the electronics and equipment needed to produce a visual image need to be attached to the mount. In fact, the projecting element itself can be detached from the mount, and the image can be carried to the beam-splitter by fiber optics or any other visual communication mechanism. In one embodiment, the projector generates a small image with a high pixel density, but larger images of lower density may be appropriate for a lower-cost, lower-resolution HMD.

A beam-splitter 16 transmits images 12 projected by the projector 8 toward the user's eye. The beam-splitter may be a piece of material which has the optical property of being partially-transmissive and partially-reflective. Such a piece of material may reflect a fraction of the light from the projector 8 which is incident on one side of it as images 12, while transmitting a fraction of the ambient light incident on the other side of it, allowing the user to simultaneously view the outside world and the projected images 12 through the beam-splitter. It should be understood that the beam-splitter in this sense refers not only to the typical beam-splitter plate or cube (an optical element which reflects part of an electromagnetic wave, while allowing a different part to pass through), but also any other device that presents a composite image (such as a digital display unit), with or without the capacity for reflection. It should also be noted that materials are known and could be used as a beam-splitter in which the translucency can be electrically varied.

The beam-splitter 16 is attached to a second rigid element 20. The rigid element can be a rod, a stiff wire, an angled or curved arm, a position-retaining flexible cable, or any other means of attaching the beam-splitter 16 in a manner accessible by the projector 8. The rigid element can be made of any number of materials, and can be transparent, partially transparent, or opaque. The rigid element is attached to the mount 4 by way of motors 24, 25. The projector 12 may be attached by way of the same rigid elements, or may be separate from them. One embodiment, provided here as a non-limiting example and shown in FIG. 1A, has two motors controlling two rigid elements 6, 20. In this way, the motors can move the beam-splitter 16 to different positions relative to the center of user's eye rotation. In this embodiment, the motors 24, 25 displace the second rigid element 20, and consequently the beam-splitter 16, within a spherical plane around the center of rotation for the user's eye. Motor 24 moves the projector 12, eye tracker 28, beam-splitter 16, and motor 25 in a pitch maneuver about the center of the user's eye, as demonstrated by arrows 23. Motor 25 moves the projector 12, eye tracker 28, and beam-splitter 16 in a yaw maneuver about the center of the user's eye, as demonstrated by arrows 27. A third motor, not shown in this drawing, could move the assembly in a roll maneuver about the center of the eye; roll compensation could also be accomplished via an advanced graphic processor.

Figure 1B:
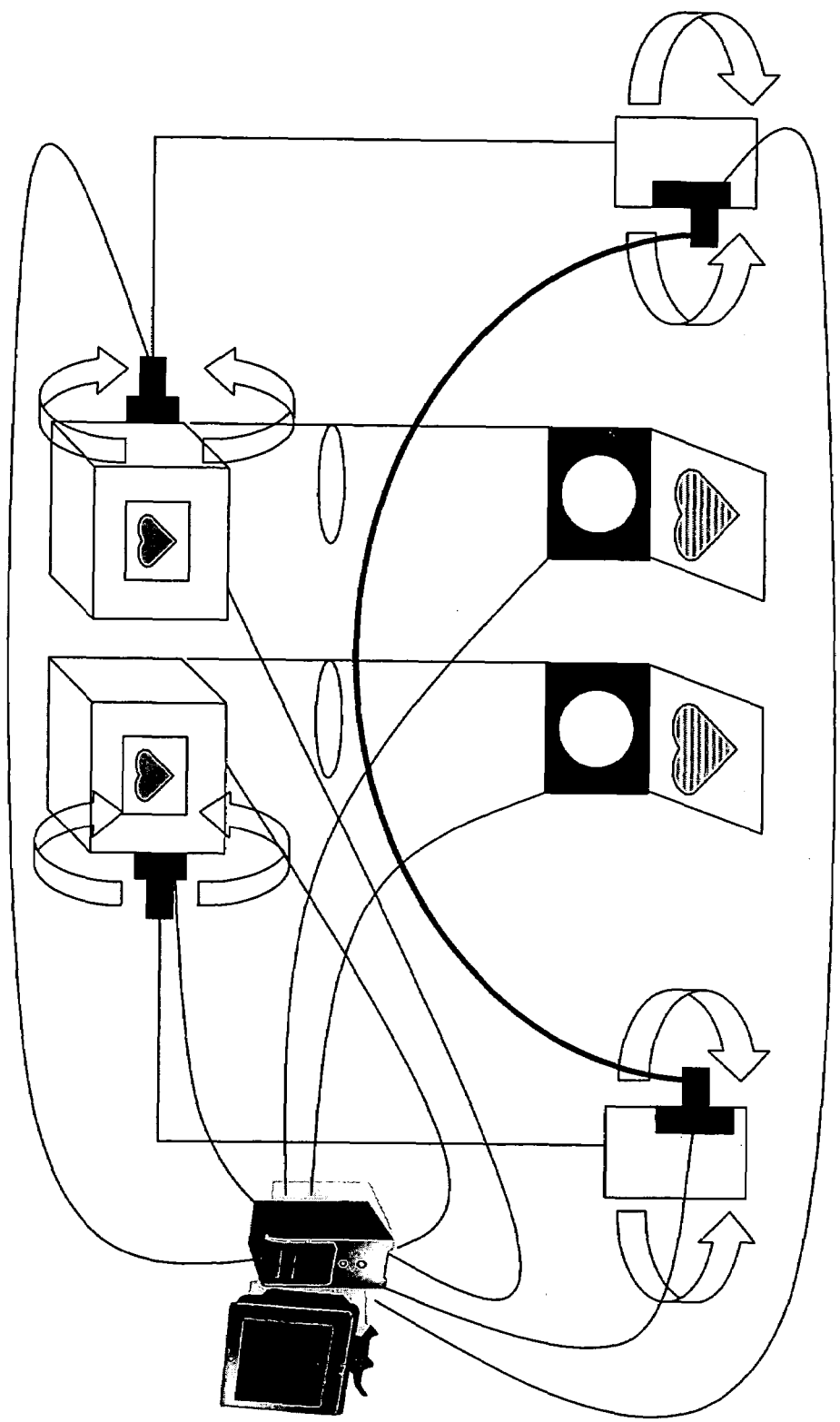
FIG. 1B is a front view of an alternate embodiment of a display according to the present invention.

While the above description sets forth a device suitable for one eye, it is to be noted that many embodiments are possible in which each eye receives its own beam-splitter, display, motors, and rigid elements. One such embodiment is shown in FIG. 1B, where a single processor controls two of the devices of FIG. 1A, one for each eye. In the following descriptions, although generally a system for one eye is discussed, it is to be assumed that the same device can be disposed on both eyes to produce a stereoptic display.

Figure 2:
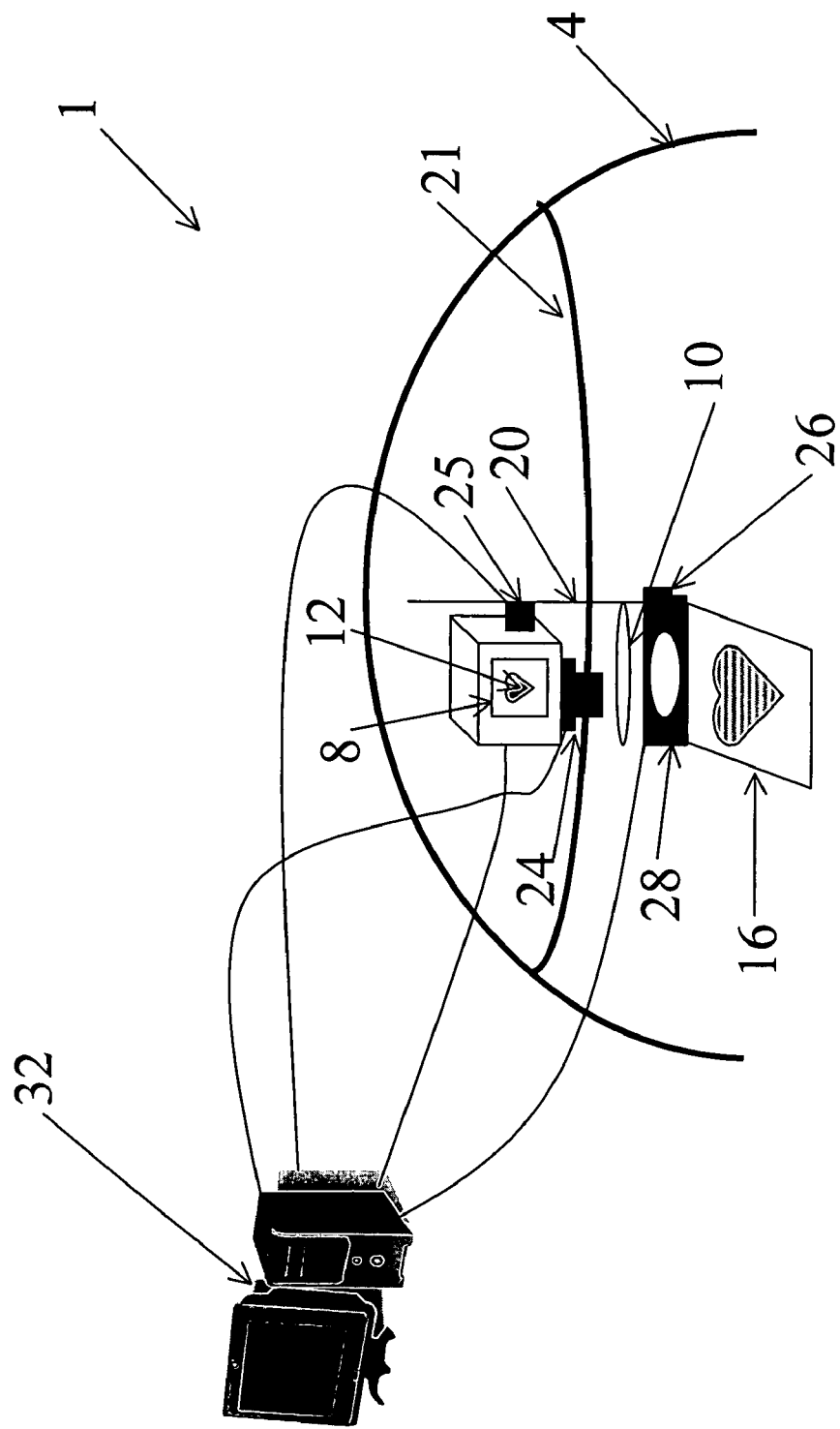
FIG. 2 shows an alternate embodiment of a display according to the present invention.

Displacement by other means is possible, as in another embodiment, provided here as a non-limiting example and shown in FIG. 2, where the motors 24 can be attached to the projector 8 and move with it along a track 21 on the mount, and can draw an element like the rigid element 20 upward or downward without the motors themselves being displaced. Additional motors 26 can change the angle of the beam-splitter 16 relative to the second rigid element 20. In this way, eye roll can be adjusted for mechanically, although this can also be addressed through image adjustment at the display or projector, or during display processing.

Note that although the embodiment described herein utilizes motors 24, 25, 26, other movement devices are usable, including servos, track feeds, belts, mechanisms of magnetic force, hydraulics, and numerous other force producers known to those skilled in the art.

By combination of these techniques, the beam-splitter 16 can be given a theoretical range of motion which extends across the entire field of view for each of the user's eyes. Other techniques for moving the beam-splitter are known to those skilled in the art. All of these designs accomplish the goal of transmitting images 12 projected by the projector 8 toward the user's eye. If a focusing lens 10 is used to collimate the projected image, the user sees in the beam-splitter an image focused to infinity, although focusing lenses can also create an image which is only in focus when the user focuses his eyes to a fixed distance from himself. To focus correctly, adjustments might be required which place the lens in a position corresponding to the center of rotation of an individual user's eye. These are exemplary designs for connecting a movable beam-splitter to a mount; it is understood that many other techniques for connecting a beam-splitter to a mount are available which are also movable.

An eye-tracker 28 can be connected to the second rigid element 20, and positioned to identify the direction of the user's gaze. An eye-tracker can also be placed between the beam-splitter and the projector 8. While the eye tracker can be placed in numerous locations, attaching the camera of the eye tracker between the beam-splitter and the projector 8 requires fewer computations to produce a robust eye tracker. The small weight of modern cameras allows the placement of a camera for an eye tracker in such a location with little effect on momentum and acceleration problems with the movement of camera mass at high acceleration when being returned to the center of the eye's gaze. Many techniques for eye-tracking are known and can be utilized here. A typical method involves the projection of a low powered infrared light into a user's eye, the observation of the reflected infrared light, and the measurement of the positions of the eye's first and fourth Perkinje images. Other methods include determining the direction of gaze by locating the pupil relative to the rest of the eye under ambient light conditions; shining an infrared light on the eye and identifying the pupil from the reflected infrared light, and even wearing a contact lens capable of tracking eye movements. The eye-tracker can measure the absolute direction of the user's gaze relative to the rigid element (that is, relative to the eye tracking device) or it can measure the angular displacement of the pupil upon each eye movement. Care should be taken in placing the eye tracking hardware so as to minimize burdens on the software where possible.

A processor 32 is in communication with the eye-tracker 28 and the motors 24, 25, and optionally the additional motor 26. The processor uses the measurements taken by the eye-tracker 28 and computes an optimal angle for the beam-splitter 16 to deliver images 12 to the user's eye. In one embodiment, the processor uses the measurements from the eye-tracker 28 to determine where a user's gaze is directed, and then sends commands to the motors 24, 25, 26 to quickly move the beam-splitter 16 to a location where it can again direct images 12 directly at the user's eye. In this way, the user is always looking through the beam-splitter 16, and hence, through the images 12.

The process of tracking the eye and adjusting the beam-splitter accordingly forms a closed-loop system, which requires very fast timing if the user is not to perceive any lag created by the processor, the eye tracker, the motors, or their combination in accomplishing the task of moving the beam-splitter back into view. While the earliest designs of this invention may involve perceivable motion, improvements in hardware and software quickly produce a system whose motion is unperceivable.

Additional motors may be used at various locations to facilitate the quickest movement of the beam-splitter. Linear and rotational motors, servo motors, and even magnetic positional devices may be used to achieve the speed, accuracy, and stepping precision needed.

Figure 3B:
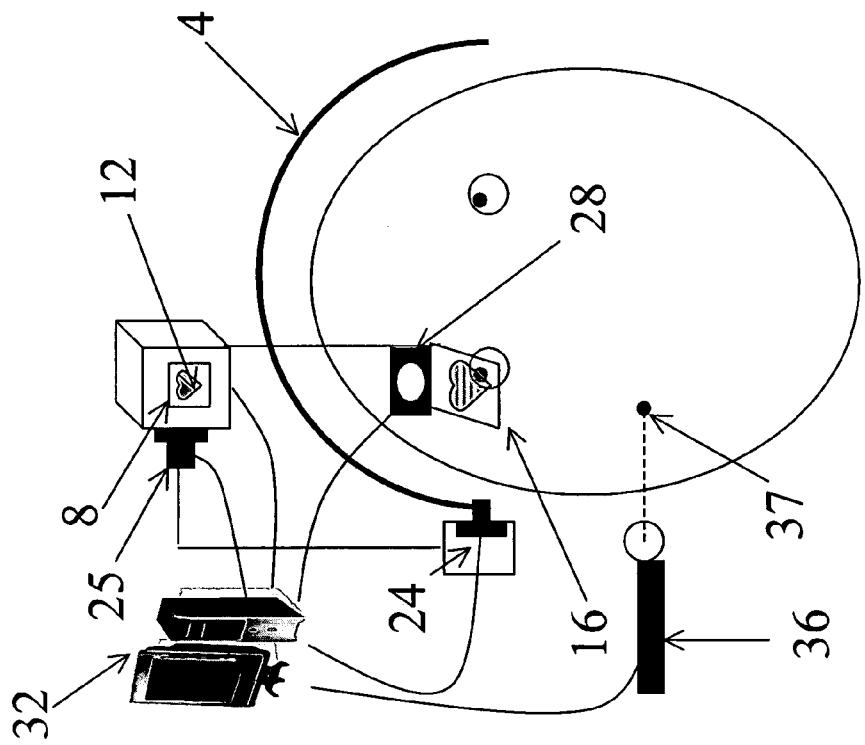
FIG. 3B shows a display according to FIG. 1A, as positioned for a user looking toward the upper right corner of his view.
Figure 3A:
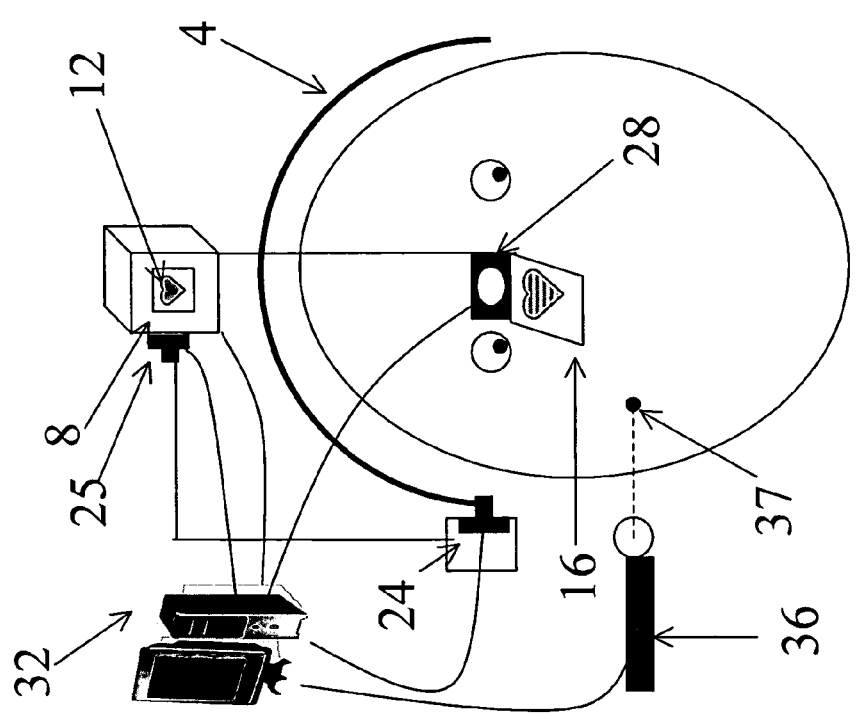
FIG. 3A shows a display according to FIG. 1A, as positioned for a user looking toward the lower-left corner of his view.

For a non-limiting example of this process, see FIGS. 3A and 3B. In FIG. 3a, the user's gaze is directed to the lower-left corner of his view, and the beam-splitter 16 is positioned to present the image 12 in the center of the user's view. In FIG. 3B, the user has now directed his gaze to the upper-right corner of his view. Accordingly, the eye-tracker 28 has measured the new direction of his gaze, the processor 32 has used these measurements to determine an appropriate position for the beam-splitter 16 and to send commands to the motors 24, 25, 26 accordingly, and the beam-splitter has been moved up and to the right, and again presents the image 12 in the center of the user's view.

It should be noted that the human eye undergoes many motions, mostly small, which are not directed to anything currently in view, and that other tasks (like reading) involve small, goal-direction eye motions. These quick and small eye motions should generally be ignored by the system, except where needed (i.e. when it is believed that such motions are informative). Tolerances of the eye tracker and beam-splitter system can be adjusted to suit an individual user, or to fit certain conditions under which the device is being used.

The processor 32 can also instruct the projector 8 to change the images 12 with respect to the direction in which the user's gaze is directed. Different images can be presented when the user looks to the left and when he looks to the right. In this way, the user can experience a "virtual environment" in which objects retain their apparent location in the space around the user; objects displayed when the user looks left will seem to be "on his left," while objects displayed when the user looks right will seem to be "on his right." A non-limiting example of this is illustrated in FIGS. 4A, 4B, and 4C. In this example, a user views a virtual display 40 (FIG. 4C) with three elements: a square to his left, a triangle straight ahead, and a circle to his right. Accordingly, when the eye-tracker and processor (not shown) determine that the user is looking straight ahead as in FIG. 4A, the processor instructs the projector 8 to display a triangle. Consequently, when the eye-tracker and processor determine that the user has moved his gaze to his left as in FIG. 4B, the processor not only changes the position of the beam-splitter, but also changes the projected image to a square, or the portion of a square currently "in view."

When each eye is given a beam-splitter, a "Virtual 3D Environment" can be presented, and is shown in FIG. 1B. All three virtual objects would then exist in a 3 space world coordinate system, and all can be computed to be projected upon the user's eye with respect to the viewer's eye's field of view, viewing direction, and lighting conditions. Standard matrix transformations can be used to compute new positions at which to project the objects with respect to the viewer's eye position and orientation in 3 space (x, y, z, yaw, pitch, and roll) in the Cartesian system, or in the spherical coordinate system, or in any other coordinate system which will allow the viewer to see the objects as consistent as the beam-splitter moves to follow the eye movements. New fields of view will be generated with each eye movement, and thus each object comes into and out of view as the viewer's eye location and orientation change.

In one embodiment of the invention, the movement of the beam-splitter is so fast as to not be salient to the user, and the beam-splitter can follow the user's gaze as he scans his eyes across any of the virtual objects. Many properties of the visual system work together to give the illusion of continuity during eye movement, and these properties can be capitalized on by the device to keep movements of the beam-splitter below perceptive thresholds.

The combination of the rigid element 20, beam-splitter 16, and motors 24, 26 produces an effective viewing area that extends to the corners of the user's eye's field of view; the user sees the display wherever he directs his fovea. This effective viewing area can be expanded to include all space surrounding the user by the use of a head tracker 36 (seen in FIGS. 3A and 3B). The head tracker can be placed in communication with the processor 32 and with the projector 8. The head tracker 36 can track motion of the user's head by identifying one or more features 37 on the head, and then tracking the head by reporting any motion of the identifying features in three-space with respect to the head tracker camera. There are six degrees of freedom for such motion, three for the head's location in space relative to a world coordinate system, and three for the head's orientation as determined by roll, pitch and yaw. Some or all of these degrees of freedom may be monitored. Various other techniques for head tracking exist, and include infrared light reflection, laser beam tracking, the tracking of a single point on the user's head or face, and mechanical means for monitoring angular displacement of the mount relative to the surrounding room. The head tracker can track head rotation and displacement in six dimensions. Other optional head trackers use magnetic tracking, or use gyros which measure and report drift. Even laser beam trackers may be used, where a device attached to the head monitors multiple laser beams and determines the position of the head based on the measured travel time of the beams and on triangulation with known spatial coordinates.

The combination of information from the head tracker 36 and the eye-tracker 28 allows the processor to generate a different image for any angle in which the user directs his gaze, in all three dimensions, with all six degrees of freedom. Extending the example above, objects retain their apparent location in all three dimensions about a user; objects displayed when a user tilts his head and looks up will seem to be "above him," while objects displayed when a user lowers his head will seem to be "below him." Alternately, the device might utilize additional cameras or sensing mechanisms to take a picture from the user's point of view, and then use that picture to construct an image corresponding to the picture. This image is then overlaid by the device onto the user's view by projecting onto the beam-splitter.

While examples have been given of static images such as squares and circles, the device is capable of producing images that are based on the outside world seen by the user through the beam-splitter in three dimensions. For example, a user of the device seated in front of a piano may see various keys appear to be illuminated. To accomplish this feat, the device must determine the direction in which the user is looking, and then present an image which corresponds in content and scale to that which is seen through the beam-splitter (in this example, the proper keys). If the device is programmed to know what objects will be in a user's eye's field of view, it can determine the proper image to present based solely on coordinates received from the eye and/or head tracker; for example, the device might know that "middle C" is directly ahead of the user at all times, and thus present a view of "middle C" every time that a user's head and eyes point straight ahead. Because the piano is placed in 3 space relative to a world coordinate system and the human eye is placed inside a world coordinate system, the exact placement of the middle C key is computed by matrix computations. The resulting image as seen by the human eye will be projected on to the human eye as if it existed in real space. This is a common way that the imagery can be computed. This imagery can be computed via special purpose image generation hardware that processes 3D images which typically uses points, polygons and texture maps.

This feat is accomplished by creating a three-dimensional database, typically using points, polygons and texture maps. If the piano key is modeled as a rectangular cube, it is given 8 points that determine the corners of the cube in three-space. When projected to the user's eye, the resulting 2D image that gets mapped upon one's retina is calculated from the three-dimensional model. The math that accomplishes this is well known, and involves a perspective divide and matrix transformations to display a mathematically correct image.

The three-dimensional database could contain a representation of the entire outside world seen by the user as depicted by points, polygons and texture maps. Sensor fusion visual data could also be stored and used. In one example, an infrared sensor-based image can be superimposed with an enhanced window view out of a vehicle, or that of a synthetic aperture radar (SAR) image. Digital terrain elevation data (DTED) information obtained from the SAR could also be superimposed. In a further example, the view as seen from an enemy's position could be represented. Many other three-dimensional, sensor-informed environments can be represented.

Note that in the above examples the eye-tracker, head-tracker, beam-splitter motors, and projector all utilize the same processor, but this is only one embodiment, and many comparable devices can be designed by utilizing multiple, separable processors. As a non-limiting example, one such processor can coordinate the beam-splitter with the eye tracker, and a separate processor can coordinate the eye tracker with the projector. In addition, although the embodiments thus far described involve direct connections between components like the eye-tracker and the processor, or between the eye-tracker and the projector, it is to be understood that such connections may involve intermediary elements, which may serve only to carry signals or may modify the signals in a variety of ways.

Using combinations of the projector 8, the lens and other optics 10, and motors 24, 26, the image 12 can be altered in various ways to optimize the user's viewing experience. For example, although one embodiment described above moves the beam-splitter 16 in a spherical plane around the user's head, other embodiments of the device may move the beam-splitter in an essentially square plane. This can produce optical distortions, as the linear distance between the eye and the beam-splitter increases with increasing angular distance from the center of the eye. There are many ways to compensate for this distortion, including stretching the image 12 in a compensatory manner before projection, shifting or shaping the image with lens and optical components 10, and adjusting the angle of the image projected using motors 24, 25, and 26. Similar adjustments can be made to compensate for any eyeball roll within the socket, and for changes to the user's depth of field. However, the ideal device makes all motion around the center of rotation of the human eye, keeps the vector of view aimed to this center, and rotates the beam-splitter, optics, camera, and projector about this center. In this way, the device minimizes mathematical compensations.

Image 12 can be further adjusted so that the image intensity matches that of the user's ambient light at the eye. Many methods are available for intensity matching. As a non-limiting example, matching can be accomplished by the swapping of the beam-splitter 16 with another beam-splitter having a different transmission index. Alternately, a polarizing beam-splitter and an image source of variable polarization may be utilized. Other solutions include beam-splitters with embedded liquid crystal density adjustment capability, and projectors 8 of variable projection intensity.

To maximize the information-delivery abilities of the display, the image 12 can be adjusted to match the density of receptor cells in the human eye. For example, the image 12 can be warped before projection so that the pixel density within the portion of the image incident on the fovea is greater than the pixel density in peripheral vision.

Figure 5A:
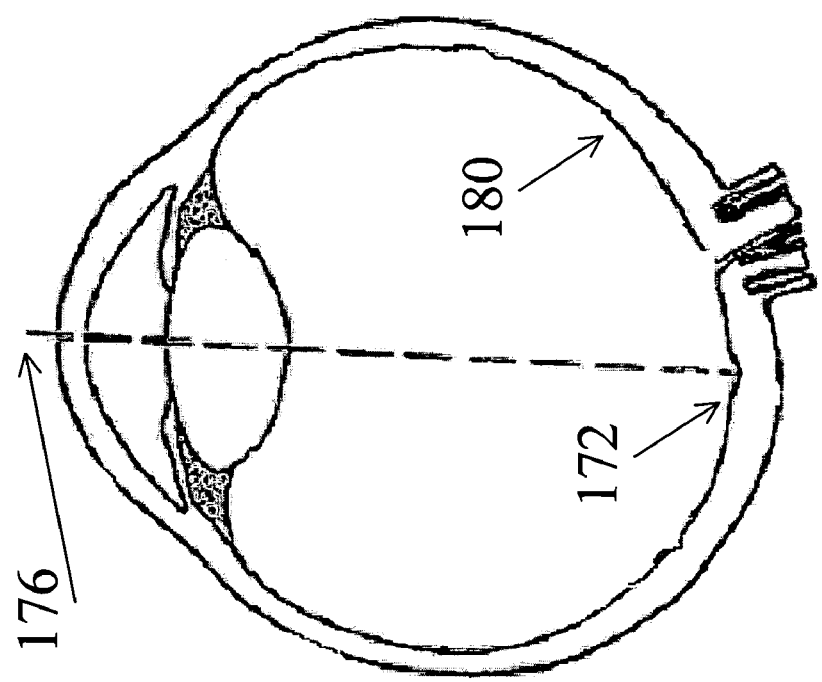
FIG. 5A shows an eye viewing an image.
Figure 5B:
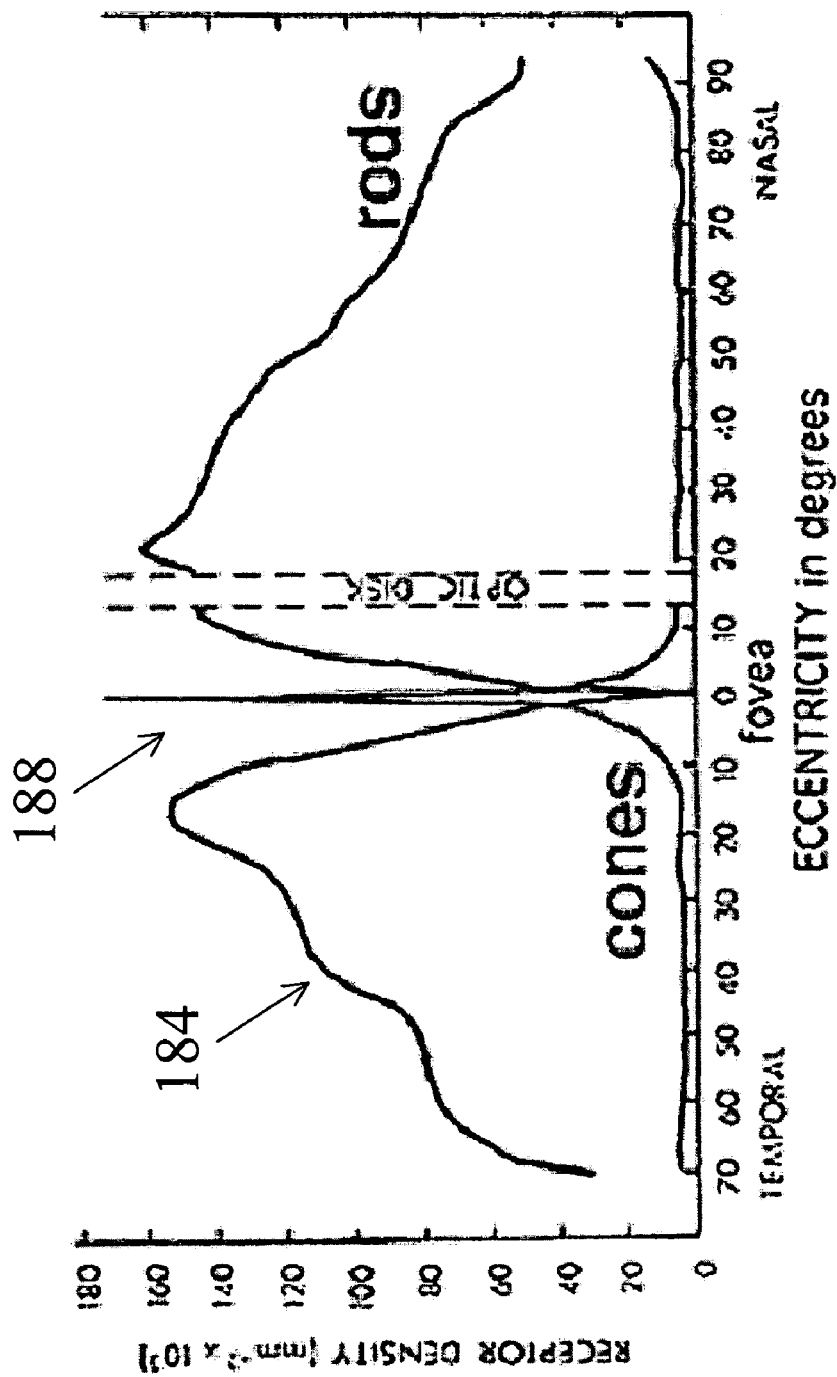
FIG. 5B shows a chart of the density of rods and cones in the eye.

In FIGS. 5A-5G, an additional aspect of the present inventive subject matter is enclosed. In FIG. 5A, when the eye views an object, light 176 reflected from the object enters the eye, and is focused on the retina 180 at the back of the eye. Light from the center of the eye's view will arrive at the sensitive center of the eye, known as the fovea 172. The retina contains photoreceptor cells called rods and cones. Rods are color-insensitive, and are sensitive to small amounts of light. Cones, while not as sensitive to the intensity of light as rods, are color sensitive, and provide a much higher visual acuity than rods. As shown in the chart of FIG. 5B, the fovea contains a high density of cones 188, and no rods. Away from the fovea, the retina contains a high density of rods 184, but nearly no cones. Since the eye's resolving power is best at the center of the eye, in regular vision the eye is always moving, assuring that light from an object of interest stays focused on the center.

Precisely because the eye is always moving, a typical display must maintain the same density of pixels in all areas of the display, so that a high density of pixels is seen wherever the eye looks. This is true of, for example, a computer monitor, or even a commercial display used in a heads-up device, which has a fixed rectangular array of pixels. This has been a heretofore inefficient but unavoidable use of resources in past displays.

Unlike these displays, the present inventive subject matter teaches a display which can follow the eye. Thus, the center of the display is always projecting to the center of the eye. Accordingly, it is possible to present a higher pixel density at the center of the image, and a lower pixel density at the periphery, thereby optimizing the delivery of optical information to the eye.

The variation of the pixel density may be simple or complex. As a non-limiting example of a simple variation of pixel density, making note of FIGS. 5C and 5D, a standard display might have a uniform density of 1200 pixels per inch, and produce an image of a tree such as that represented by image 200, whereas variation of pixel density might produce 600 pixels per inch around the outer 50% of an image 204, and 1800 pixels per inch within the inner 50% of an image 208, while requiring no more manufacturing or display resources than the 1200 pixel per inch standard displays manufactured today. While such a variable display would be ineffective if used like a standard display (since the eye could easily turn toward the periphery, placing the lower density area in the center of the eye), such a variable display would be ideal for the presently disclosed inventive subject matter, wherein the high-density center of the image 208 remains slaved to the high-receptor-density center of the eye.

Figure 5E:
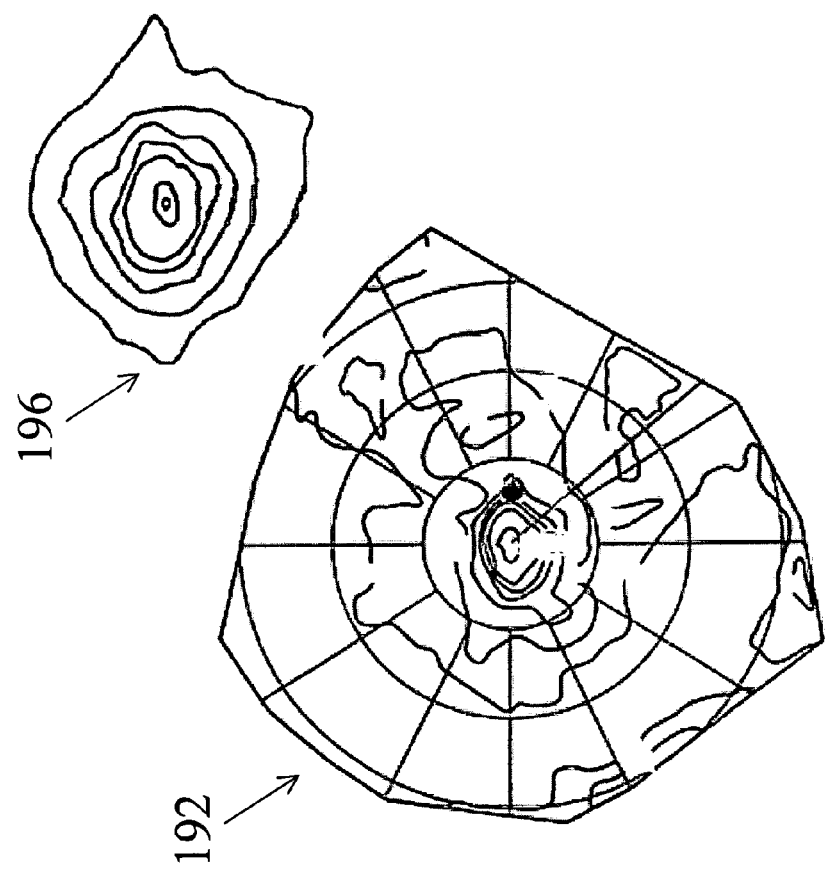
FIG. 5E shows a density contour map of receptors in the eye.

A non-limiting example of a complex variation of pixel density could be based on the known distribution of receptors in the eye. Examples of contour isodensity maps of the eye are shown in FIG. 5E, where contour lines identify increasing receptor densities, in the fovea 196 and in the remainder of the retina 192. These contour maps could form an index for the variation of density across the display. The density of pixels on the display could be modified to match, or vary in proportion with, the known density of cells on the average eye, particularly in the fovea. For an even more accurate display, a user's eye and fovea could be scanned and analyzed for density measurements, and the display could be adjusted according to the cell density in the individual's eye.

There are numerous ways of displaying an image in which the pixel density of the display varies. A non-limiting example involves modifying the display at the time of manufacture to place more pixels at the center of the display, and fewer pixels at the periphery. In such a design, the pixels at the periphery might have to be larger, so that no empty space is seen between the less-dense pixels. While the total number of pixels might remain the same as in a standard display (thus keeping constant the processing demands for presenting an image), the redistribution of pixels can create an image with much greater accuracy than the standard display ever could.

Figure 5G:
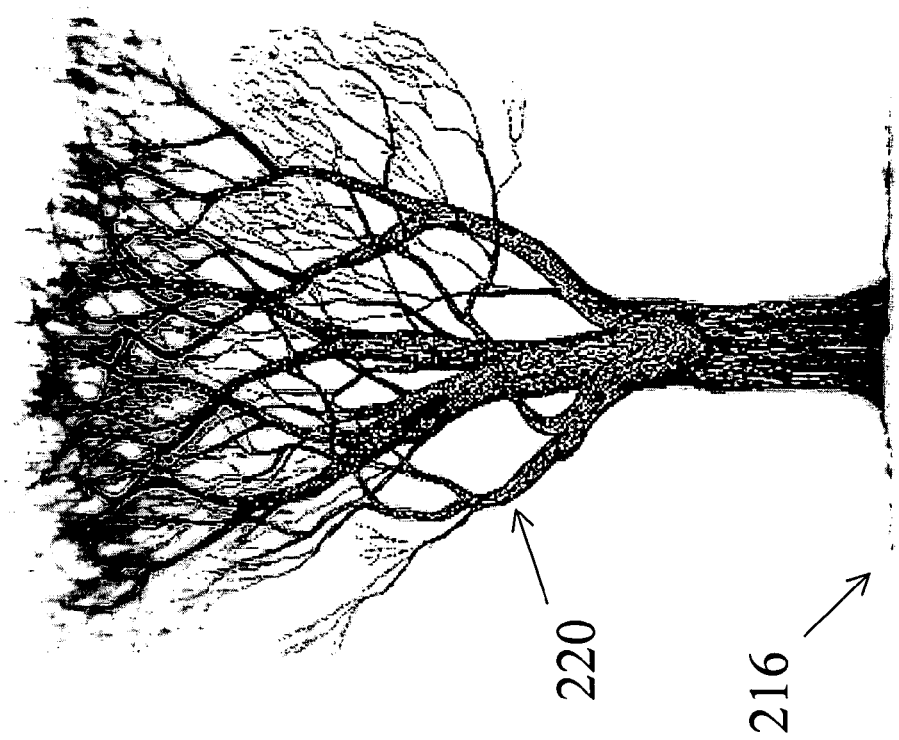
FIG. 5G shows an additional stage of an image as produced by the display of FIG. 5F.
Figure 5F:
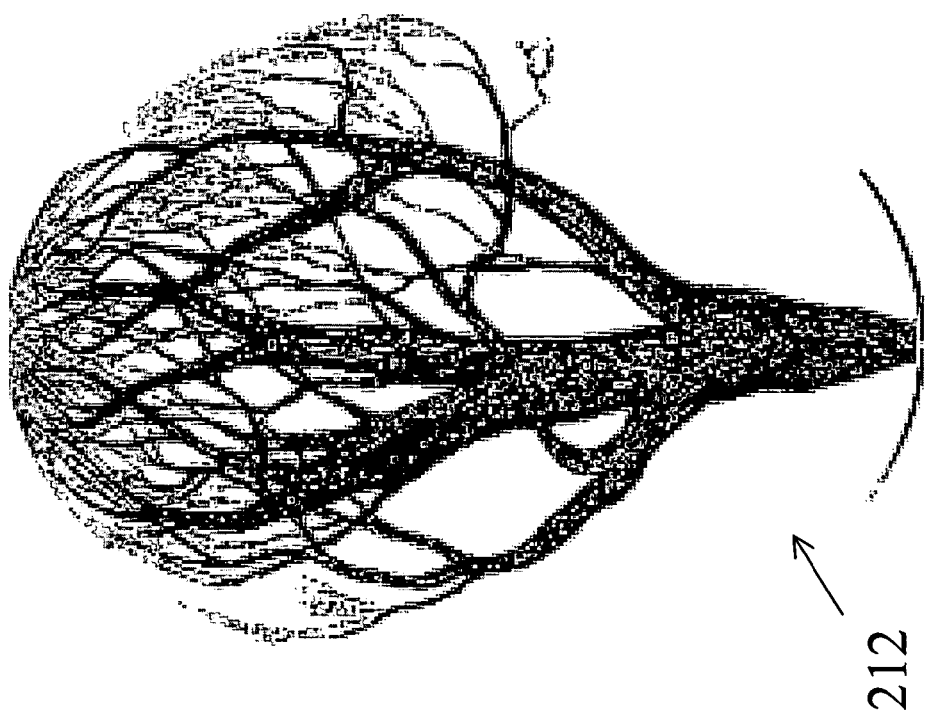
FIG. 5F shows a stage of an image as produced by another display according to the present invention.

Another non-limiting example for varying the pixel density of the display involves taking a standard, constant-density rectangular display, and mapping and warping the image it produces to match the receptor density and characteristics of the eye. In this two-step process, an image in the memory of a computer is sent to the display in a spatially disproportionate manner: the center of the image is mapped to a disproportionately large number of pixels at the center of the display, while the periphery of the image is mapped to a disproportionately small number of pixels at the periphery of the display. Seen after mapping in FIG. 5F, the displayed image 212 appears to "bulge" in the middle (where, for example, one square centimeter of image might occupy two square centimeters of display), and appear "pinched" at the periphery (where, for example, one square centimeter of image might occupy only half a square centimeter of display). However, lenses and other optics would then take the displayed image and warp it back to the correct proportions, as shown in FIG. 5G. The resulting image would appear proportionally accurate to the user, but would possess a greater pixel density at the center 220 than at the periphery 216, matching the cell density of the user's eye.

Again, such a design is nearly impossible with a standard display, meaning any display in which the user is free to move his eye to the edges of the display area. The presently claimed inventive subject matter teaches a display in which the center of the display is slaved to the center of the eye. Thus, maximum display resources can be expended at the center of the eye, where the eye possesses maximum acuity, at all times. Display resources are spent on producing the highest resolution imagery only where the eye is best built to receive it.

Other non-limiting examples of displays, such as contact-lens displays or retinal implants, could also vary their pixel density, as they too remain in a fixed location relative to the eye. No motors or moving parts are needed for such a display, as it is "attached" to the eye by means of the contact lens or implant.

Pixel density is just one non-limiting example of a display characteristic that can be made to vary with changing characteristics across the eye. Additional non-limiting examples of display characteristics that can be optimized in this manner include color distribution, pixel intensity, image focus, display surface reflectivity, and motion representation (pixel change across time).

It should be noted that the embodiments described thus far involve variable numbers of optical components. The device can operate with just a single beam-splitter and a single display, or can utilize additional optics like a focusing lens, or a lens for concentrating the warped image as described above. The device is further capable of operating under conditions requiring additional optics. Some such conditions have been described above, and include varying densities of ambient light and the modification of the image to compensate for changes in the viewing angle. An important addition is the above-mentioned use of a second beam-splitter, second projector, and second set of motors for producing a second set of images at the user's other eye. Together the two sets of images, provided to the two eyes, can create stereoptic images which appear at varying distances away from the user, allowing the brain to produce a three-dimensional image from two two-dimensional projections, just as in regular vision. Each beam-splitter may be provided with its own eye tracker, or a single eye-tracker may be sufficient to determine the ideal location for both beam-splitters.

Although the above embodiments allow for the beam-splitter to move in three dimensions (yaw, pitch, and roll), other embodiments can be limited to two or even one degree of freedom (such as yaw and pitch only, or yaw only). These embodiments may function only when the eye moves in the limited dimension(s), or can compensate (for example, by adjusting the image before it is projected, or by moving the image placement on the surface of the beam-splitter). Some examples of these embodiments will now be described.

Figure 6:
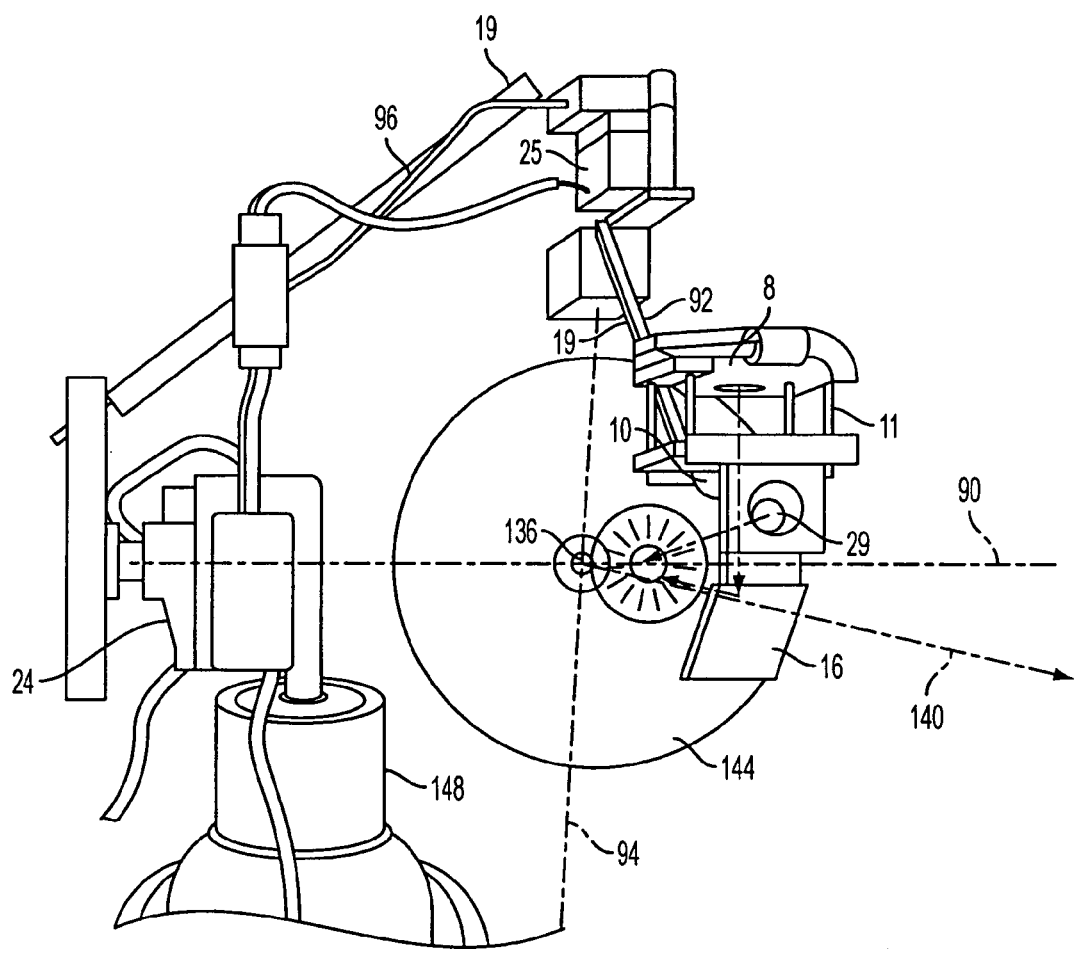
FIG. 6 shows a front perspective view of an alternate embodiment of a display according to the present invention.
Figure 7:
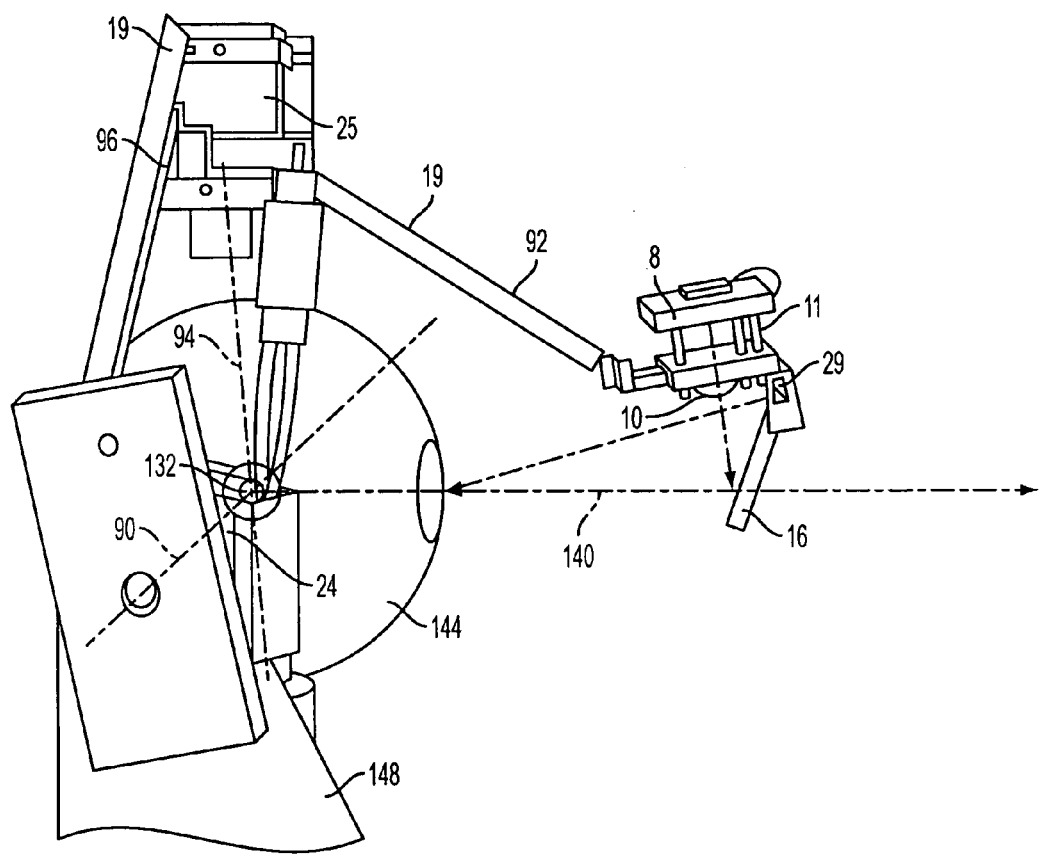
FIG. 7 shows a side view of the embodiment of FIG. 6.
Figure 8:
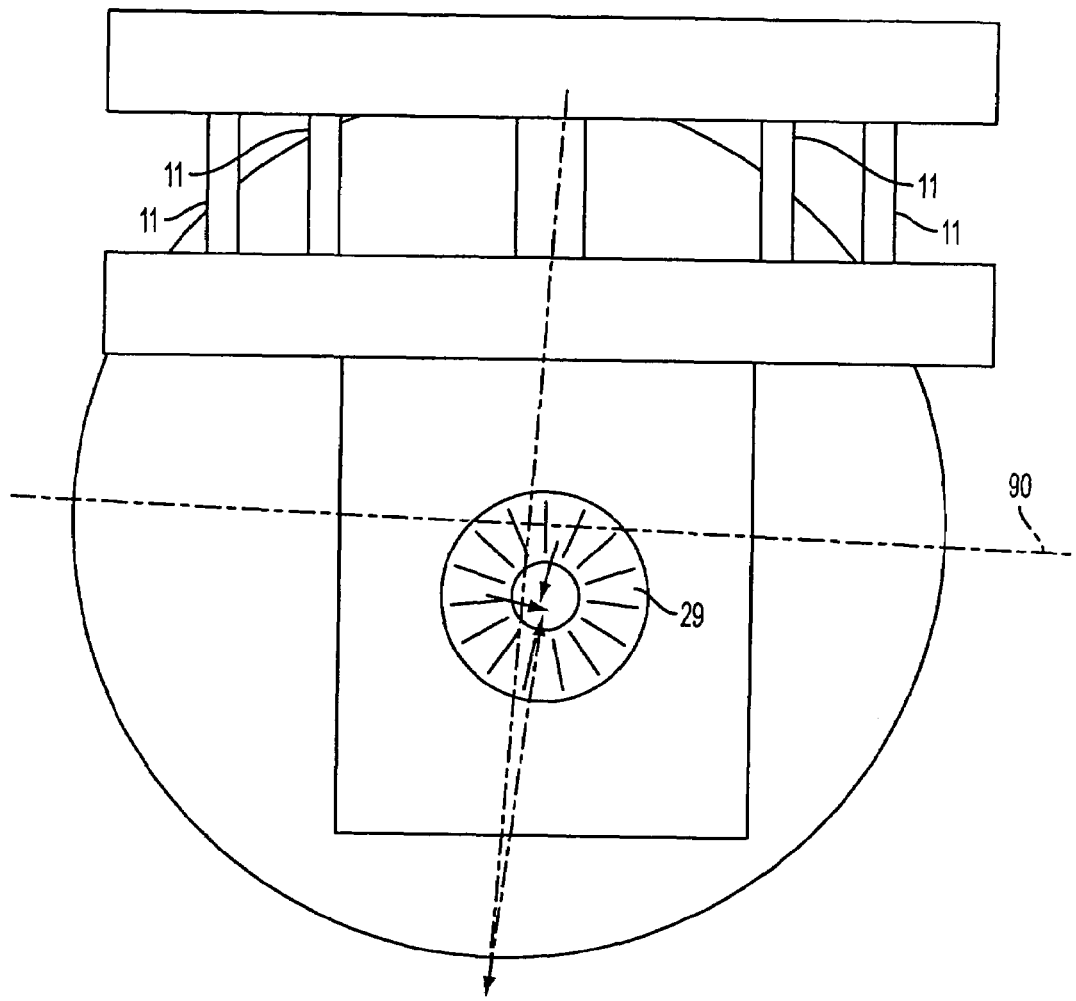
FIG. 8 shows the embodiment of FIG. 6, as seen through the opening for the eye tracker camera.

FIGS. 6, 7, and 8 show three views of an embodiment in which the beam-splitter is moved in two dimensions about the center of the user's eye (pitch and yaw). For demonstration purposes, the device is shown attached to stationary mount 148, and an oversized representation of the eye is shown as element 144. Roll is compensated for when necessary by image adjustment. Beam-splitter 16 takes the images sent by the display 8 and reflects the images toward 136, the center of the eye, in the direction of dashed arrow 140. Specifically, center of the eye 136 refers to the center of the eye's own rotation, and not necessarily to the anatomical center of the eye as organ. The projected image is traced out by the dashed line from the display to the eye. The brightness of the image is controlled by the reflective index of the beam-splitter and that of the brightness of the display. (A back light can be applied in certain display systems making the imagery brighter or less brighter depending upon the voltage given to the back light, as shown at element 116 in FIG. 9 below).

Focusing lens 10 can focus the imagery for the user's eye, both to compensate for deficiencies in the user's vision, and as a function of the intended viewing distance. It can also be the distortion lens that re-distorts the imagery so that a higher concentration of the pixels is focused on the area of the eye that has a higher density of cones.

The focusing lens 10 is moved on focus adjustment pillars 11. In this embodiment, the focus is adjusted manually by moving the top display back and forth in distance to the focusing lens, although automatic focusing systems are well known in the art. Pitch attachment and movement arm 92 (visible in FIG. 6 and FIG. 7), a rigid element, is attached to an assembly including the focusing lens 10, the adjustment pillars 11, the housing for the eye tracker 29, the display 8, and the beam-splitter 16. In this design, the eye tracker can include a camera (removed in this view, but shown as element 30 in FIG. 9 and FIG. 10) placed in the housing for the eye tracker 29.

FIG. 8 shows a model eye as seen through the device (that is, from behind the eye tracker 29 and beam-splitter 16. The dashed arrow descending from the housing for the eye tracker 29 shows what an eye tracking camera would observe, and is only slightly offset from the eye's gaze, represented by the dashed line aimed toward the beam-splitter. By placement of a camera in this position, the human eye is easily tracked. As the human eye moves away from center, the eye tracker notices that the eye is not the same position, and moves the assembly described above back to the center of the eye's gaze by servo motors 24 and 25.

Servo motor 24 rotates about vector 90 to create pitch motion of the beam-splitter about the center of the eye 136. Servo motor 25 rotates about vector 94 to create yaw motion of the beam-splitter about the center of the eye 136. Roll motion can be created by altering the images produced at the display 8, although mechanical solutions are also possible such as rotation around vector 140. Roll motion is needed because the human eye will rotate upon commands given by the inner ear, for example when the head is tilted. This rotation can be picked up by the eye tracker software, and the image can be moved respectively to compensate.

Yaw attachment and movement arm 96 connects the pitch servo motor 24 to the yaw servo motor 25. Both yaw attachment and movement arm 96, and pitch attachment and movement arm 92 are enhanced with stiffeners 19 to dampen vibrations, although many other methods of dampening vibrations are known to those skilled in the art. Image stabilization techniques, similar to those used in video cameras, can also be used to keep an image steady despite small movements of the beam-splitter.

Figure 9:
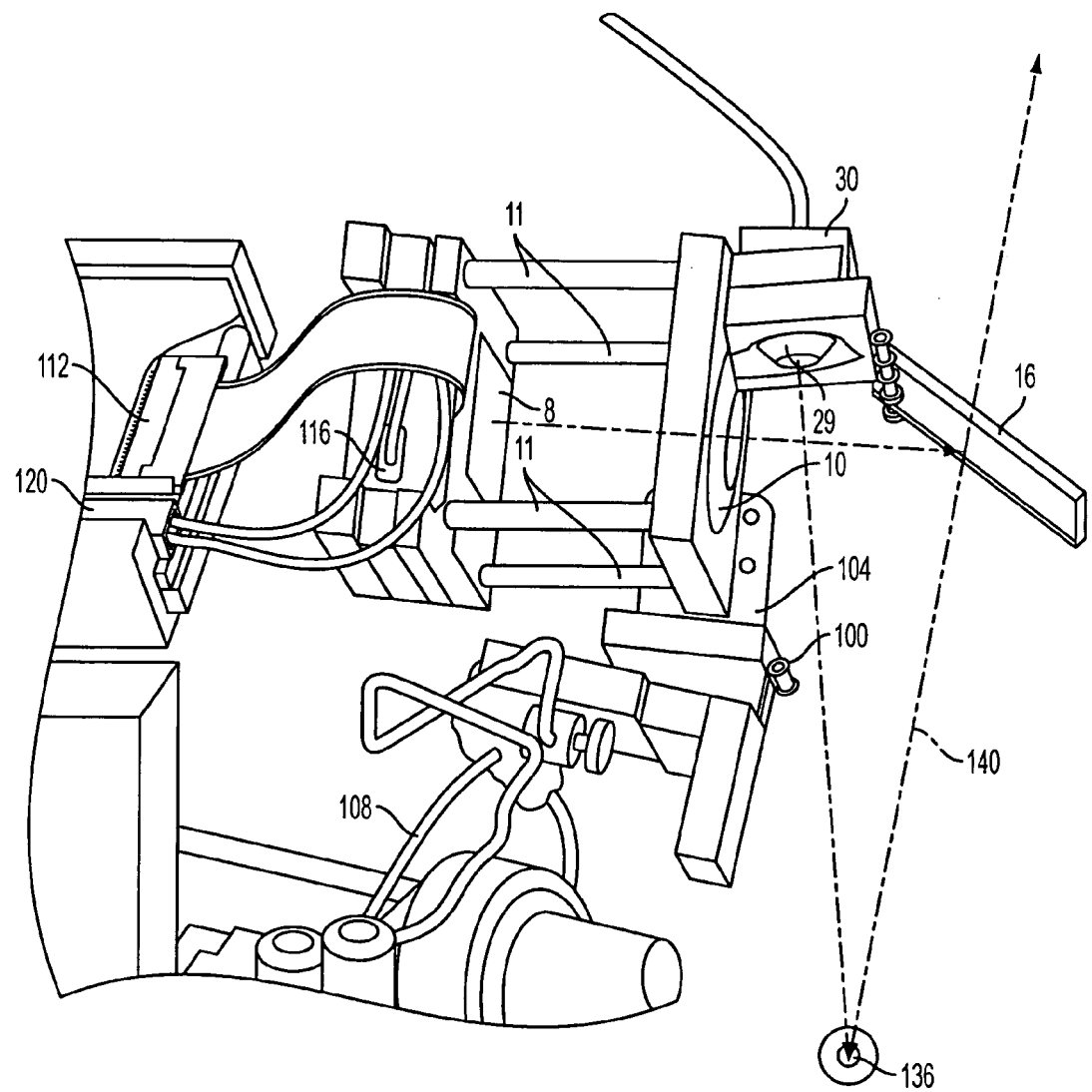
FIG. 9 shows a side view of an alternate embodiment of a display according to the present invention.
Figure 10:
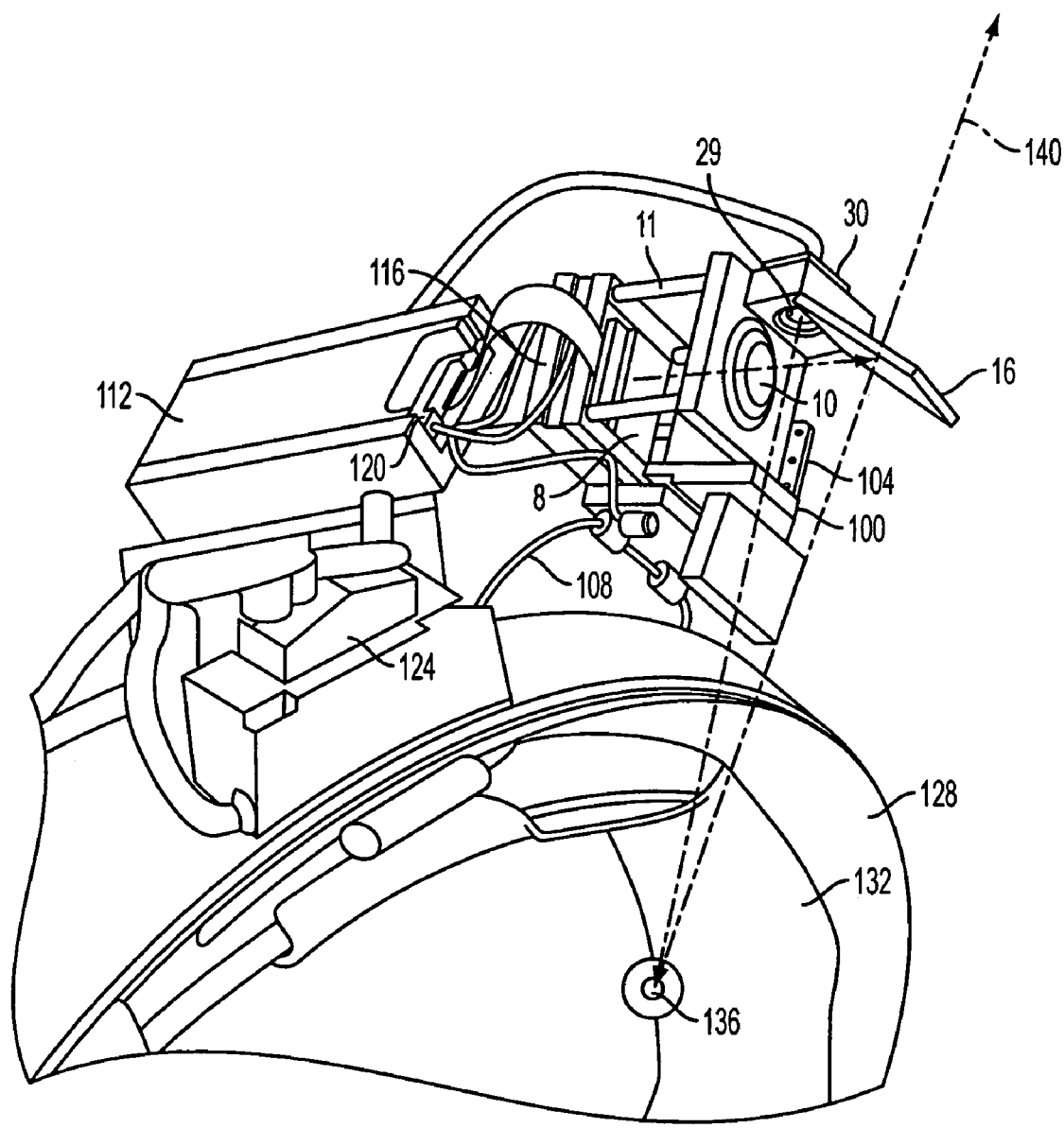
FIG. 10 shows a bottom perspective view of the embodiment of FIG. 9.

FIGS. 9 and 10 show an embodiment of the present invention which limits movement of the beam-splitter to only yaw about the center of the eye 136. This embodiment uses a hard hat 128 with a comfort head band 132 as a mount. In this embodiment, yaw rotation bar 108 served as the track on which the beam-splitter assembly glides to keep the image focused upon the eye center. Pitch adjuster 100 and yaw adjuster 104 allow for manual adjustment to aim the display more accurately toward the human eye, as in this embodiment (though not all embodiments) pitch is not automatically adjusted by the eye tracker. Beam-splitter 16 can also be adjusted to make final adjustments of the image direction, shown by the dashed-line arrow 140 toward the center of the eye 136. Roll can still be achieved by the rotation of the image via computer image processing techniques.

Display processor 112 is connected by cables 120 to backlight 116 and LCD 8. Back light 116 can be applied in certain display systems making the imagery brighter or less brighter depending upon the voltage given to the back light. A lightweight flexible ribbon wire is used for communicating with the display, and the length can be varied to adjust to the needs of the mount. The electronics are very light (typically less than 4 oz.), and can be attached to a helmet (as shown here attached to a hard hat), or can be attached to a structure near the head, depending upon system limitations. In this embodiment, servo motor 124 moves the beam-splitter assembly about the center of the eye 136 by carrying it along yaw rotation bar 108. A camera 30 placed in the housing for the eye tracker 29 is used to track the motion of the eye, but as above, other systems for eye tracking are well known in the art.

Figure 11A:
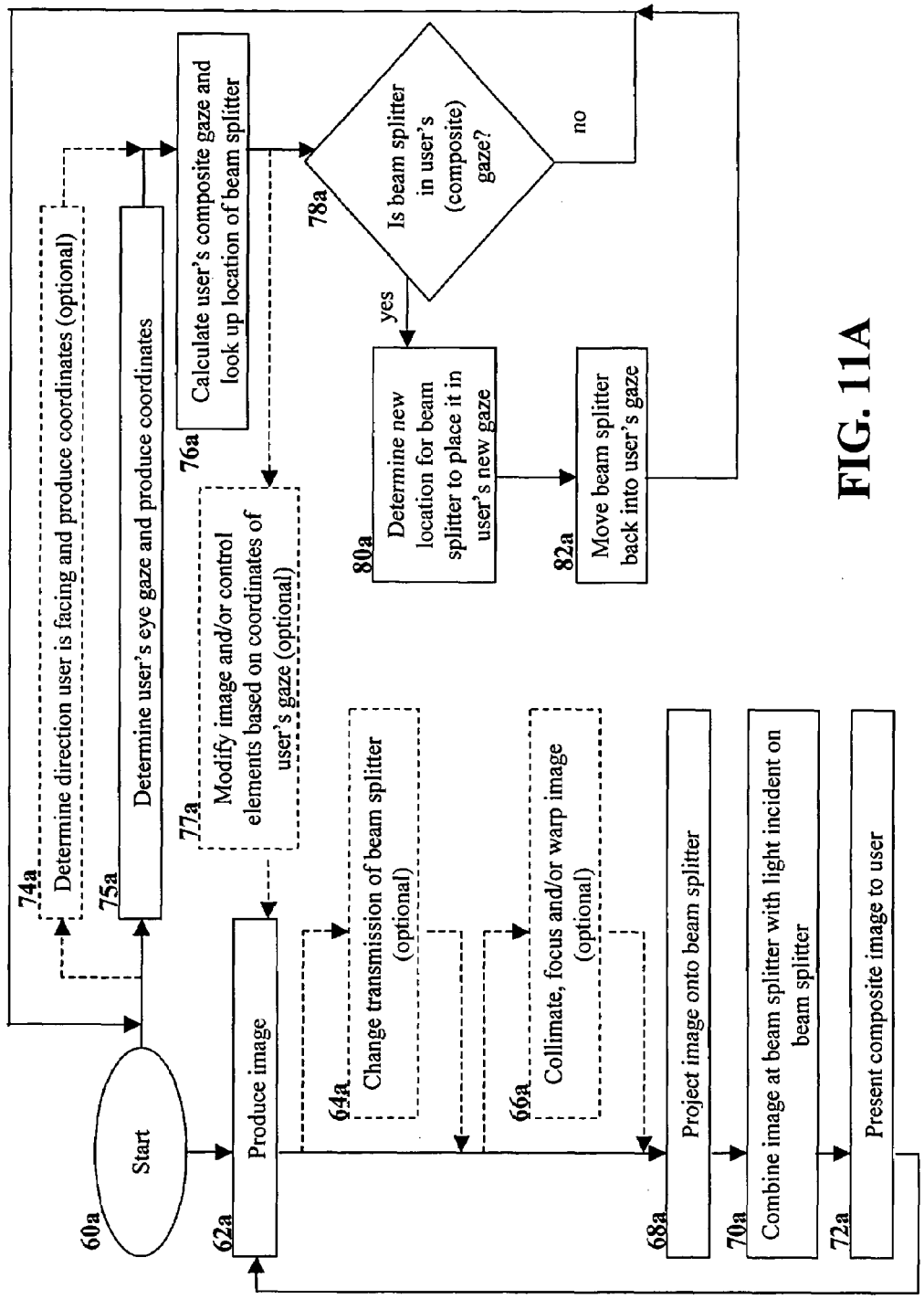
FIG. 11A shows a flow chart of a method for using a display according to the present invention.

A flowchart diagram of a method for using the disclosed invention is presented as FIG. 11A. The method begins at start 60*a* with the step 62*a* of producing an image for display. The image produced may depend on conditions in the environment of the user, as discussed in detail above, or may be independent of the user's environment. At the step 68*a*, this image is projected onto a beam-splitter. At this same time, one may perform the optional step 64*a* of changing the transmission of the beam-splitter to match the ambient light in the user's environment, or to match the intensity of light incident on the beam-splitter. At this time, one may also perform the optional steps 66*a* of collimating, focusing, and/or warping the image. When the projected image arrives at the front of the beam-splitter, the image (at step 70*a*) is combined with light incident on the back side of the beam-splitter. Subsequently at step 72*a* the composite image is presented to the user's eye, and the process begins again at step 62*a* with the production of another image.

The method also involves a concurrent sequence of steps, beginning also at start 60*a* and proceeding to step 75*a*, where the user's eye gaze is determined and coordinates corresponding to the user's eye gaze are produced. Simultaneously, if desired, one can perform the optional step 74*a* of determining the direction the user is facing, and producing a second set of coordinates corresponding to the user's face direction and to the user's head location. At step 76*a*, coordinates for the user's eye gaze and face direction (if so measured) are combined to determine the user's "composite gaze," and the location of the beam-splitter is recalled. Here, composite gaze means the direction the user's eyes are facing, accounting both for the position and direction of the user's eye gaze and for the position of the head and the direction of the face (if so measured). The composite gaze coordinates can optionally be used (at step 77*a*) to modify the image or control elements in a virtual environment based on the coordinates.

If at step 78*a* the beam-splitter is found to be in the user's composite gaze, or if the difference between the gaze coordinates and the beam-splitter position is below a defined threshold, then the process cycles and the method continues again from step 75*a* (optionally including step 74*a*). However, if the beam-splitter is not in the user's gaze, then at step 80*a* a new location for the beam-splitter is determined, such that the beam-splitter will again be directly in the user's composite gaze. Subsequently, at step 82*a*, the beam-splitter is moved back into the user's composite gaze, and the method continues again from step 76*a* (optionally including step 74*a*).

Figure 11B:
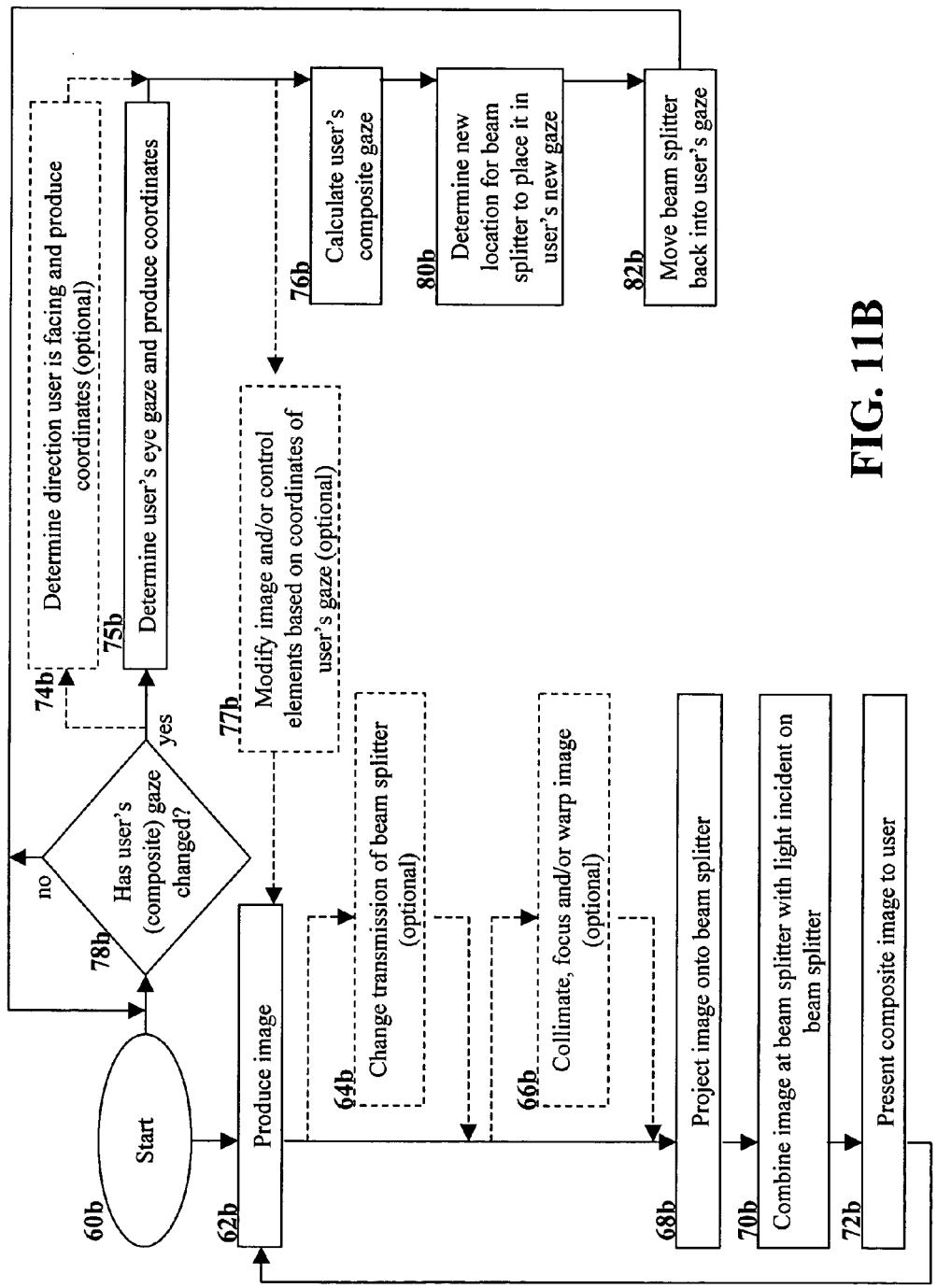
FIG. 11B shows a flow chart of an alternate method for using a display according to the present invention.

In FIG. 11B, a variation of the method is disclosed. Here, similar to FIG. 1A, the method begins at start 60*b* with the step 62*b* of producing an image for display. The image produced may depend on conditions in the environment of the user, as discussed in detail above, or may be independent of the user's environment. At the step 68*b*, this image is projected onto a beam-splitter. At this same time, one may perform the optional step 64*b* of changing the transmission of the beam-splitter to match the ambient light in the user's environment, or to match the intensity of light incident on the beam-splitter. At this time, one may also perform the optional steps 66*b* of collimating, focusing, and/or warping the image. When the projected image arrives at the front of the beam-splitter, the image (at step 70*b*) is combined with light incident on the back side of the beam-splitter. Subsequently at step 72*b* the composite image is presented to the user's eye, and the process begins again at step 62*b* with the production of another image.

As in FIG. 11A, this method involves a concurrent sequence of steps, beginning also at start 60*b*, but here proceeding first to step 78*b*, where it is determined if the user's gaze has changed. If the user's gaze has not changed, a loop is created, and step 78*b* is repeated until such a change is observed. In this manner, the method need not involve repeated accurate measurements of eye and face position; rather, the method depends waiting for eye or face motion, and measuring the composite gaze ONLY when motion of the eyes or face is determined. Once such a change in the composite gaze is observed, the method proceeds to step 75*b*, where the user's eye gaze is determined and coordinates corresponding to the user's eye gaze are produced. Simultaneously, if desired, one can perform the optional step 74*b* of determining the direction the user is facing, and producing a second set of coordinates corresponding to the user's face direction and to the user's head location. The composite gaze coordinates can optionally be used (at step 77*b*) to modify the image or control elements in a virtual environment based on the coordinates.

At step 76*b*, coordinates for the user's eye gaze and face direction (if so measured) are combined to determine the user's "composite gaze," although unlike in step 76*a* of FIG. 11A, there is no need to recall the location of the beam-splitter. Next, at step 80*b* a new location for the beam-splitter is determined, such that the beam-splitter will again be directly in the user's composite gaze. Subsequently, at step 82*b*, the beam-splitter is moved back into the user's composite gaze, and the method continues again from step 78*b*.

The above two embodiments are examples of the method disclosed in this application, and it should be noted that modifications and variations of the method are possible, including the addition of steps or the rearrangement or combination or one or more steps, without departing from the scope of the method as disclosed.

The disclosed invention overcomes many of the failures of previous HMDs. The above invention can be implemented with lightweight components of a moderate price, and can use a mount like a helmet worn by a soldier, a standard hardhat worn by a construction worker, or a hat specially designed for the comfort of the user. The disclosed invention produces virtual images just as easily in the center of the user's eye's field of view, at its periphery, and even behind the user; there are no blind-spots in the user's view. The disclosed invention uses a limited number of optical elements, such as a single beam-splitter and a single focusing lens, which reduces the weight of the device, minimizes any physical occlusion of the user's view, and decreases the momentum which must be overcome by the servos/motors when producing large accelerations to move the display (up to 400 degrees per second, in $\frac{1}{60}^{th}$ of a second, the update frame rate). A small projector with a high pixel-density can be used with the movable beam-splitter to create a large, sharp field of view, and can be further enhanced by the warping techniques introduced above in reference to FIGS. 5A-5G. The use of a single beam-splitter in place of numerous beam-splitters, mirrors, and other optical elements, produces far less loss of image intensity and quality than in previous designs.

The present invention has particular utility in the field of warehouse management, where a HMD can assist a user in performing warehousing functions in a simple, visual, real time/non real time, three-dimensional environment. Such a utility allows organizations to more efficiently manage the warehousing process. The present invention is simple and light enough to make its application at all levels of warehousing feasible. For an example of the many ways in which this invention can be utilized in warehousing, see U.S. Pat. No. 6,744,436 to Chirieleison, Jr. et al, cited above.

The present invention has many other applications, including the following non-limiting examples. This invention could be used by every home PC user to create a virtual office. One could replace his office with a virtual office, placing virtual papers on the wall, virtual pictures on the wall, and creating an endless arrangement of documentation easily viewable as if one had file drawers in which to pull up documents. When combined with similar systems, one could produce a company where workers sit in a room at home, but engage in total interaction as if in an office.

The medical field could also benefit from this technology. People who are paralyzed could use this floating eye display to give direction to a wheel chair only by moving their eye or head. Full situational awareness can be created with the addition of rear mounted cameras to the wheel chair.

Another application is in embedded military training. One could take the cockpit of any aircraft or vehicle and display it on a general simulator. The device would simulate the internal computer displays for each vehicle, so that one could train in one vehicle while sitting in another. Such application would exist in systems like the Future Combat System, in which manned vehicles are to be built with a common chassis. Another such vehicle is the Stryker of General Dynamics, which has a common chassis but multiple variants. Another is the Bradley fighting vehicle of BAE systems. With the disclosed invention, it is envisioned that any of the vehicles could act as a training vehicle for the entire suite of vehicles.

Yet another application could be in the area of remote sensing, or piloting of an unmanned aerial vehicle. One could operate the vehicle as if he is the pilot of the vehicle, but be safe at a remote location. Sensors on the outside of the vehicle could allow him to have unlimited vision in all directions.

The cockpit and structure of aircraft generally could change as a result of this invention. The streamlining of a vehicle would not depend on the canopy bubble that the pilot would have to look through, making the aircraft have less drag. One would not have to look outside the vehicle to gain situational awareness, as one could use sensors on the aircraft to gain views of all surrounding the aircraft in a 360 degree sphere as projected through this invention. The same goes true for any vehicle in any environment. One would need only to look outside only in an emergency situation where he loses sensors, which otherwise feed images and information to a display according to the present inventive subject matter. In the case of military vehicles which currently have heads-up displays with old technology, not having to add all those bulky and heavy displays would allow overall vehicle weight to be reduced, most importantly in helicopters and aircraft. The ability to see through the aircraft would give a total situation awareness. The added ability to see the environment through any sensors that beams information to the vehicle would allow this invention to extend the "range" of an operator's vision in many ways.

The automotive industry could benefit from this invention as well. The device could be built into a car and create situational awareness to improve driver safety. One could easily place cameras in locations to see the blind spot, or to view a child in the back seat. Sensors that see beyond the human vision, such as night vision would allow the driver to see better at night for instance. Older HMDs which restricted the field of view, or give one poor vision, were deterrents to the common driver using a device to improve safety with night vision. The present inventive subject matter can solve these problems.

A Teleoperated Ground Vehicle (TGV), a non-limiting example of which being a Building and Tunnel Searcher ("Searcher"), could also benefit from the present inventive subject matter. In teleoperation a human operator controls a robotic vehicle from a distance. The connotation of teleoperation is that the distance is or can be great enough that the operator cannot see directly what the vehicle is doing. Therefore, the operator's information about the vehicle's environment and its motion in that environment depends critically on sensors that acquire information about the remote location. The present inventive subject matter could serve as a display technology for allowing the operator to visualize the vehicle's environment, and assist in the communication link between the vehicle and the operator. In a TGV, the operator controls the actions of the vehicle through a control interface. The sensors onboard the vehicle and the communications link allow the operator to visualize the TGV's location and movement within its environment through information displays, which typically include: display(s) of the teleoperated ground vehicle's location using a geolocation system, and images of the vehicle's environment based on data transmitted through the communications link from sensors onboard the TGV. The Searcher would be a small ground vehicle that would carry high-resolution sensors and other lightweight payloads. The soldier-operator would be equipped with visual display according to the present invention, and control devices such as a joystick and touch pad. Communications between the soldier and the ground vehicle would be by radio or wire as the situation dictated, while the soldier would be provided with an immersive operating environment for controlling the Searcher. Other non-limiting examples of a TGV for which the present display would be well suited include an Unmanned Ground Vehicle (UGV) or Unmanned Aerial Vehicle (UAV)

Other applications for the present inventive subject matter include: integrated synergistic use of joint and Army manned and unmanned, air and ground RSTA (reconnaissance, surveillance, and target acquisition) to gain and maintain contact with enemy elements and to provide high-resolution combat information on terrain and weather; a small soldier-portable reconnaissance and surveillance robot UGV; a Mule UGV—a 1-ton vehicle suitable for an RSTA or transport/supply mission; an Armed Reconnaissance Vehicle (ARV)—a 6-ton vehicle to perform the RSTA mission, as well as a fire mission, carrying a turret with missile and gun systems; and, any application requiring manned and unmanned ground, air, and space means to extend vision beyond line of sight to gain timely combat information through passive and aggressive RSTA networked into an integrated common operational picture (COP) for unprecedented situational awareness and understanding.

Returning to general issues involved in presenting an image to a user, it should be noted that a second special processor may be used to correct for distortions in projecting the image, and to accomplish the image warping described above. Although software solutions may be developed to optimize these processes, a hardware solution may be the fastest and lightest. Specifically, a special image generating processor may come designed with hardware necessary to perform standard image adjustments and distortion correactions quickly and repeatedly. As a non-limiting example, Field Programmable Gate Array (FPGA) hardware devices could be programmed to add the special hardware processing necessary to accomplish the demanding tasks at hand in this invention.

It should further be noted that the present invention describes a useful way to present a high-density image which remains at the center of a user's eye. To create an image which extends to the periphery of the user's visual field, a wide field-of-view image can be projected onto a screen, or onto the inside of a visor like an astronaut's visor. Simultaneously, a display like the present invention could be used to produce high-resolution images at the fovea. The combination of the two displays would only further increase the information which can be presented to the user.

It should be further noted that, although the mounts described herein project the image onto the beam-splitter from above the user's head, other designs are possible in which the projector is located below the user's head, or to the side of the user's head, but projecting onto the beam-splitter in a manner similar to that above.

An important future extension to this device may involve directly mounting the device to the user's eye. The design of a thin contact lens with electronic display capabilities could allow the "beam-splitter" to be replaced with such a contact lens, which would stay at the center of a user's field of view much as a traditional contact lens does. Just as described above, the device would be in electronic communication with a projector, which is itself in communication with a processor, for the production of images. Here, the contact lens could also serve as an eye-tracker; although the lens would stay in the center of the eye, it could report the direction of the user's gaze, which would allow the processor to change the images to produce a virtual environment as described above. An even more efficient extension of this design may come when retinal implants present an image at the back of the eye and directly to the user's brain, which could even present information in a user's "blind spot."

Having described the invention in detail and by reference to the embodiments thereof, it will be apparent that modifications and variations are possible, including the addition of elements or the rearrangement or combination or one or more elements, without departing from the scope of the invention which is defined in the appended claims.

What is claimed is:

1. A head mounted display device, the device comprising:
a mount which secures the device near a user's head;
a beam-splitter attached to said mount with movement devices, wherein said movement devices displace said beam-splitter about a center of rotation of an eye of the user, and wherein said beam-splitter:
reflects at least one output image toward the user's eye, and
transmits light incident on said beam-splitter to the user's eye;
an image projector, which projects said at least one output image onto said beam-splitter;
an eye-tracker which measures the viewing direction of an eye of the user and produces corresponding coordinate information; and
at least one processor, in communication with said eye-tracker and said movement devices, which commands said movement devices to reposition said beam-splitter based on said coordinate information,
wherein the device further comprises a focusing lens to focus said at least one output image based on the current focal distance of the user's eye.

2. The device of claim 1 wherein said at least one processor commands said movement devices to keep said beam-splitter in a user's line-of-sight.

3. The device of claim 1, wherein said eye tracker comprises a camera attached between said mount and said beam-splitter.

4. The device of claim 1, the device further comprising a head-tracker which determines the direction a user's head is facing; wherein said at least one processor is further in communication with said head tracker, and wherein said coordinate information further comprises measurements received from said head-tracker.

5. The device of claim 1, wherein said image projector is in communication with said at least one processor, and wherein said processor provides data to said projector for composing images.

6. The device of claim 1, wherein said image projector is rigidly attached to said beam-splitter.

7. The device of claim 1, wherein said at least one output image is displayed with increased pixel density at locations corresponding to increased density of light receptor cells in the user's eye.

8. The device of claim 1, wherein said at least one output image is adjusted to compensate for angular displacement from the user's eye.

9. The device of claim 1, wherein said movement devices move the beam-splitter in one or more of the following dimensions relative to the user: yaw, pitch, roll, up-down, left-right, forward-backward.

10. The device of claim 1, wherein said beam-splitter has a transmission index appropriate for the intensity of ambient light in the environment of use.

11. The device of claim 1, wherein said eye-tracker determines a user's line-of-sight.

12. The device of claim 1, wherein said eye-tracker registers when a user's line-of-sight changes.

13. The device of claim 1, comprising
a second beam-splitter attached to said mount with second movement devices, wherein said second movement devices displace said second beam-splitter about a center of rotation of a second eye of the user, and wherein said second beam-splitter:
reflects at least one output image toward the user's second eye, and transmits light incident on said second beam-splitter to the user's second eye; and a second image projector, which projects said at least one second output image onto said second beam-splitter;

wherein said at least one processor is in communication with said second eye-tracker and said second movement devices, and commands said second movement devices to reposition said second beam-splitter.

14. The device of claim 1, wherein said processor uses said coordinate information to allow the user to control objects in the virtual environment with gaze.

15. A head mounted display device, the device comprising:
a mount which secures the device near a user's head;
a beam-splitter attached to said mount with movement devices, wherein said movement devices displace said beam-splitter about a center of rotation of an eye of the user, and wherein said beam-splitter:
reflects at least one output image toward the user's eye, and
transmits light incident on said beam-splitter to the user's eye;
an image projector, which projects said at least one output image onto said beam-splitter;
an eye-tracker which measures the viewing direction of an eye of the user and produces corresponding coordinate information; and
at least one processor, in communication with said eye-tracker and said movement devices, which commands said movement devices to reposition said beam-splitter based on said coordinate information,
wherein the image projector changes its image based on information received from the eye-tracker.

16. The device of claim 15, wherein the image projector further comprises a virtual display, said virtual display having effective dimensions larger than those of said beam-splitter, and wherein said at least one output image is a portion of the virtual display which corresponds to a user's line-of-sight.

17. The device of claim 15 wherein said at least one processor commands said movement devices to keep said beam-splitter in a user's line-of-sight.

18. The device of claim 15, wherein said eye tracker comprises a camera attached between said mount and said beam-splitter.

19. The device of claim 15, the device further comprising a head-tracker which determines the direction a user's head is facing; wherein said at least one processor is further in communication with said head tracker, and wherein said coordinate information further comprises measurements received from said head-tracker.

20. The device of claim 15, wherein said image projector is in communication with said at least one processor, and wherein said processor provides data to said projector for composing images.

21. The device of claim 15, wherein said image projector is rigidly attached to said beam-splitter.

22. The device of claim 15, wherein said at least one output image is displayed with increased pixel density at locations corresponding to increased density of light receptor cells in the user's eye.

23. The device of claim 15, wherein said at least one output image is adjusted to compensate for angular displacement from the user's eye.

24. The device of claim 15, wherein said movement devices move the beam-splitter in one or more of the following dimensions relative to the user: yaw, pitch, roll, up-down, left-right, forward-backward.

25. The device of claim 15, wherein said beam-splitter has a transmission index appropriate for the intensity of ambient light in the environment of use.

26. The device of claim 15, wherein said eye-tracker determines a user's line-of-sight.

27. The device of claim 15, wherein said eye-tracker registers when a user's line-of-sight changes.

28. The device of claim 15, comprising
a second beam-splitter attached to said mount with second movement devices, wherein said second movement devices displace said second beam-splitter about a center of rotation of a second eye of the user, and wherein said second beam-splitter:
reflects at least one output image toward the user's second eye, and
transmits light incident on said second beam-splitter to the user's second eye; and
a second image projector, which projects said at least one second output image onto said second beam-splitter;
wherein said at least one processor is in communication with said second eye-tracker and said second movement devices, and commands said second movement devices to reposition said second beam-splitter.

29. The device of claim 15, wherein said processor uses said coordinate information to allow the user to control objects in the virtual environment with gaze.

* * * * *